(12) United States Patent
Moshe et al.

(10) Patent No.: US 12,271,486 B2
(45) Date of Patent: Apr. 8, 2025

(54) PEER STORAGE DEVICE MESSAGING FOR VULNERABILITY MANAGEMENT

(71) Applicant: Western Digital Technologies, Inc., San Jose, CA (US)

(72) Inventors: Eran Moshe, Kfar Saba (IL); Danny Berler, Tel-Mond (IL); Saifullah Nalatwad, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 353 days.

(21) Appl. No.: 17/839,727

(22) Filed: Jun. 14, 2022

(65) Prior Publication Data
US 2023/0401321 A1    Dec. 14, 2023

(51) Int. Cl.
G06F 21/57    (2013.01)
G06F 16/182    (2019.01)
H04L 67/104    (2022.01)

(52) U.S. Cl.
CPC ........ *G06F 21/577* (2013.01); *G06F 16/1837* (2019.01); *G06F 2221/034* (2013.01); *H04L 67/104* (2013.01)

(58) Field of Classification Search
CPC .............. G06F 21/577; G06F 16/1837; G06F 2221/034; H04L 67/104
See application file for complete search history.

(56) References Cited

U.S. PATENT DOCUMENTS

| | | |
|---|---|---|
| 10,257,268 B2 | 4/2019 | Cencini et al. |
| 10,733,116 B2 | 8/2020 | Litichever et al. |
| 2005/0240591 A1* | 10/2005 | Marceau ................. G06F 16/10 707/999.009 |
| 2007/0277242 A1* | 11/2007 | Baker ................. H04L 63/1408 726/25 |
| 2009/0290715 A1* | 11/2009 | Mityagin ............... H04L 63/062 380/278 |
| 2012/0284794 A1* | 11/2012 | Trent .................... H04L 67/104 726/23 |
| 2014/0297742 A1* | 10/2014 | Lyren .................... H04L 65/403 709/204 |
| 2017/0116103 A1 | 4/2017 | Cencini et al. |
| 2020/0201995 A1* | 6/2020 | Gahlot ................ G06F 21/6218 |
| 2020/0218617 A1* | 7/2020 | Knestele ............... G06F 9/5027 |
| 2022/0164139 A1 | 5/2022 | Moshe et al. |
| 2023/0014136 A1* | 1/2023 | Young ..................... G06F 21/55 |

OTHER PUBLICATIONS

Griffin et al., "On the feasibility of intrusion detection inside workstation disks," Parallel Data Laboratory, Carnegie Mellon University, Dec. 2003, 29 pgs.

Pennington et al., "Storage-Based Intrusion Detection," ACM Transactions on Information and System Security, vol. 13, No. 4, Article 30, Dec. 2010, 27 pgs.

* cited by examiner

*Primary Examiner* — Huan V Doan
(74) *Attorney, Agent, or Firm* — Patent Law Works LLP

(57) ABSTRACT

Systems and methods for peer data storage device messaging over a peer channel, such as a control bus, for vulnerability management are disclosed. Storage devices may include a host interface configured to connect to a host system and a peer interface to establish peer communication independent of host availability. The storage devices may determine security issues (for themselves or for peer storage devices) and send a threat notification through the peer interface, enabling peer storage devices to respond to peer security threats without relying on their host connections.

20 Claims, 9 Drawing Sheets

PEER STORAGE DEVICE MESSAGING FOR VULNERABILITY MANAGEMENT

TECHNICAL FIELD

The present disclosure generally relates to vulnerability management for data storage devices devices interconnected through a peer communication channel and, more particularly, to peer device vulnerability management through a low-bandwidth control bus without host system intervention.

BACKGROUND

Some computing systems, such as storage arrays, may include multiple storage devices supporting one or more host systems through a peripheral or storage interface bus, such as peripheral component interconnect express (PCIe), serial advanced technology attachment (SATA), or serial attached [small computer serial interface (SCSI)] (SAS). These interfaces may be configured for high-bandwidth transfer rates, such as 3 gigabits (Gb)/second (s), 6 Gb/s, 8 Gb/s, 12 Gb/s, 16 Gb/s, etc., to enable fast and reliable data transfer to and from storage devices, with some versions supporting as high as 512 Gb/s.

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Each storage device in a multi-device storage system may be connected to a host system through at least one high-bandwidth interface, such as PCIe, using an appropriate storage protocol for the storage device, such as non-volatile memory express (NVMe) for accessing solid state drives (SSDs) or the storage blades of all flash arrays. Some multi-device storage systems employ storage devices capable of communicating with one another and/or host systems over the interconnecting fabric and/or network fabric through the high-bandwidth interface. Such fabric-based distributed storage systems may include storage devices configured with direct memory access to enable more efficient transfer of data to and from hosts and other systems.

In some configurations, each storage device may also include another interface that is configured for power management and/or low-bandwidth communication with computing devices sharing the same utility or control bus. For example, storage devices may include a control bus interface that complies with inter-integrated circuit (I2C), improved inter-integrated circuit (I3C), system management bus (SMBus), or similar low-bandwidth control bus protocols. These command buses may interconnect the storage devices within a multi-device storage system and provide a synchronous, multi-master, packet switched, serial communication bus. In some computing systems, control bus pins may be included as part of the physical peripheral interface connector. So, for example, a PCIe physical interface connector may include a set of I2C, I3C, or SMBus pins at one end of the connector for providing the low-bandwidth control interface. For comparison to the high-bandwidth peripheral interfaces used for data transfer, these low-bandwidth control bus interfaces may support ~3-30 megabits (Mb)/s and may operate as low as 100 kilobits (kb)/s.

In some systems, the low-bandwidth control bus may be initialized for communication early in the boot cycle of the storage devices to assist with power management, discovery, and access to external resources, such as temperature sensors, fan controllers, light emitting diode (LED) indicators, etc. Storage devices may have access to the control bus before host communication or control is established through the high-bandwidth peripheral bus.

In some configurations, data storage devices attached to the same interconnecting fabric may support multiple hosts and these hosts may not have visibility into the physical configurations of the storage devices (including the peer devices sharing an enclosure or other physical interconnects, such as a control bus). As a result, storage devices in the same multi-device storage system may support different hosts and those hosts may have no knowledge of other hosts and/or of other storage devices in that storage system. This may present a security threat because hosts may not be relied on to share threats with other hosts and, even if a threat is identified, the host may not know what other storage devices are at risk if they are not mapped to that host. Additionally, if a host is compromised or a threat interferes with the host interface or host availability, the storage devices may have no way to protect against the security threat.

Enabling peer data storage devices to manage security threats, such as malware, hackers, and rogue software, without waiting for or relying on the host system may be advantageous. A reliable and efficient way of providing vulnerability management to peer storage devices without relying on peripheral or storage bus communications with the host may be needed.

SUMMARY

Various aspects for peer storage device vulnerability management, particularly messaging among peer storage devices over a peer communication channel for security threat notifications and analysis across peer storage devices, are described.

One general aspect includes a system that includes a first data storage device including: a processor; a memory; a host interface configured to connect to a host system; a peer interface configured for peer communication with a plurality of peer data storage devices; a vulnerability manager configured to determine a security issue for the first data storage device; and a peer messaging service configured to send, through the peer interface and responsive to determining the security issue, a threat notification to at least one peer data storage device of the plurality of peer data storage devices.

Implementations may include one or more of the following features. The peer interface may include a control bus interface configured to connect to a control bus; the data storage device may further include a control bus protocol configured for the peer communication through the control bus; and the peer communication with the plurality of peer data storage devices may be independent of availability of the host system. The first data storage device may further include security configuration data configured to map a plurality of security issue types to a plurality of threat levels, and the vulnerability manager may be further configured to: determine, based on a security issue type for an identified security issue, a corresponding threat level from the plurality of threat levels; and selectively change, based on the corresponding threat level, an operating mode of the first data storage device. The identified security issue may be selected from: the security issue for the first data storage device; and a threat notification received from at least one peer data storage device of the plurality of peer data storage devices. Selectively changing the operating mode of the first data storage device may include entering a read only mode. Sending the threat notification may include sending a broadcast message to the plurality of peer data storage devices; and the broadcast message may include a security issue type for the security issue. The system may further include the plurality of peer data storage devices where each peer data storage device of the plurality of peer data storage devices may include: security configuration data for that peer data storage device; and a vulnerability manager for that peer data storage device configured to determine a response to the broadcast message based on the security issue type and the security configuration data for that peer data storage device. A first response by a first peer data storage device of the plurality of peer data storage devices may be different than a second response of a second peer data storage device of the plurality of peer data storage devices. The peer messaging service may be further configured to periodically receive, from the at least one peer data storage device, a threat check message and sending the threat notification may be responsive to receiving the periodic threat check message. The vulnerability manager may be further configured to collect device data for determining the security issue and the collected device data may be selected from: firmware states, interface states, security logs, cryptography test data, boot logs, and debug logs. The first data storage device may further include a threat sharing service configured to select at least a portion of the collected device data for the first data storage device. The peer messaging service may be further configured to: send, to at least one peer data storage device of the plurality of peer data storage devices, the portion of the collected device data; and receive, from at least one peer data storage device of the plurality of peer data storage devices, peer device data collected from the at least one peer data storage device. The vulnerability manager may be further configured to: analyze the peer device data for security issues; determine a peer security issue for the at least one peer data storage device; and determine a response to the peer security issue.

Another general aspect includes a computer-implemented method including: establishing, from a first data storage device, peer communication with a plurality of peer data storage devices, where the first data storage device and each peer data storage device of the plurality of peer data storage devices include a host interface configured to connect to a host system and a peer interface configured for peer communication with a plurality of peer data storage devices; determining a security issue for the first data storage device; and sending, through the peer interface and responsive to determining the security issue, a threat notification to at least one peer data storage device of the plurality of peer data storage devices.

Implementations may include one or more of the following features. The peer interface may include a control bus interface configured to connect to a control bus; the first data storage device and each peer data storage device of the plurality of peer data storage devices may further include a control bus protocol configured for the peer communication through the control bus; and the peer communication with the plurality of peer data storage devices may be independent of availability of the host system. The computer-implemented method may further include: determining, based on a security issue type for an identified security issue, a corresponding threat level from a plurality of threat levels, where the first data storage device and each peer data storage device of the plurality of peer data storage devices further include security configuration data configured to map a plurality of security issue types to the plurality of threat levels; and selectively changing, based on the corresponding threat level, an operating mode of the first data storage device. The computer-implemented method may include: receiving, by the first data storage device and from at least one peer data storage device of the plurality of peer data storage devices, a threat notification through the peer interface; determining the identified security issue from the threat notification; and determining the security issue type for the identified security issue. Selectively changing the operating mode of the first data storage device may include entering a read only mode. Sending the threat notification may include sending a broadcast message to the plurality of peer data storage devices and the broadcast message may include a security issue type for the security issue. The computer-implemented method may include periodically receiving, by the first data storage device and from the at least one peer data storage device, a threat check message, where sending the threat notification is responsive to receiving the periodic threat check. The computer-implemented method may include collecting, by the first data storage device and each peer data storage device of the plurality of peer data storage devices, device data for determining security issues, where the collected device data is selected from: firmware states, interface states, security logs, cryptography test data, boot logs, and debug logs. The computer-implemented method may include: selecting, by the first data storage device and each peer data storage device of the plurality of peer data storage devices, at least a portion of the collected device data for that data storage device; sending, from the first data storage device to at least one peer data storage device of the plurality of peer data storage devices, the portion of the collected device data for the first data storage device; receiving, by the first data storage device and from at least one peer data storage device of the plurality of peer data storage devices, the portion of the collected device data for the at least one peer data storage device; analyzing, by the first data storage device, the portion of the collected device data for the at least one peer data storage device for security issues; determining, by the first data storage device, a peer security issue for the at least one peer data storage device; and determining a response to the peer security issue.

Still another general aspect includes a storage system that includes a control bus and a plurality of peer data storage devices, where each peer data storage device of the plurality of peer data storage devices includes: a processor; a memory; a host interface configured to connect to a host system; a control bus interface configured to connect to the control bus; means for establishing, through the control bus interface, peer communication among the plurality of peer data storage devices; means for determining a security issue for a first data storage device of the plurality of peer data storage devices; and means for sending, through the control bus interface and responsive to determining the security issue, a threat notification to at least one peer data storage device of the plurality of peer data storage devices.

The various embodiments advantageously apply the teachings of storage devices and/or multi-device storage systems to improve the functionality of such computer systems. The various embodiments include operations to overcome or at least reduce the issues previously encountered in storage arrays and/or systems and, accordingly, are more reliable and/or efficient than other computing systems. That is, the various embodiments disclosed herein include hardware and/or software with functionality to improve the management of data storage device vulnerabilities, such as by using peer messaging over a control bus among storage devices for security threat notification and analysis. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
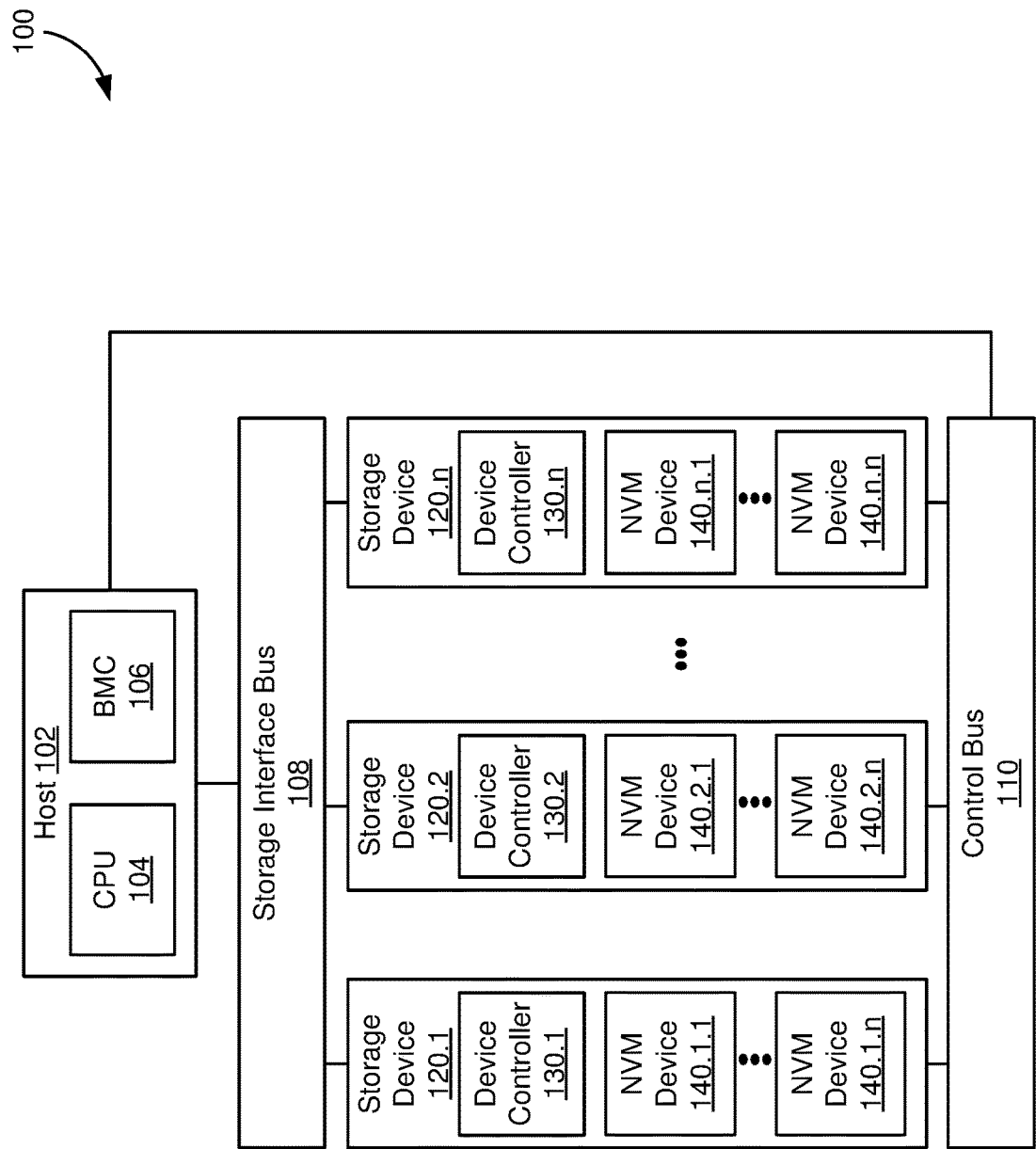
FIG. 1 schematically illustrates a multi-device storage system with a storage interface bus and a control bus.

FIG. 1 shows an embodiment of an example data storage system 100 with data storage devices 120 interconnected by both storage interface bus 108 and control bus 110, where the control bus may provide a peer communication channel independent of host communications. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, disk drives, or drives). In some embodiments, storage devices 120 may be configured in a server or storage array blade or similar storage unit for use in data center storage racks or chassis. Storage devices 120 may interface with one or more hosts 102 and provide data storage and retrieval capabilities for or through those host systems. In some embodiments, storage devices 120 may be configured in a storage hierarchy that includes storage nodes, storage controllers, and/or other intermediate components between storage devices 120 and host 102. For example, each storage controller may be responsible for a corresponding set of storage nodes and their respective storage devices connected through a corresponding backplane network, though only storage devices 120 and host 102 are shown.

In the embodiment shown, a number of storage devices 120 are attached to a common storage interface bus 108 for host communication. For example, storage devices 120 may include a number of drives arranged in a storage array, such as storage devices sharing a common rack, unit, or blade in a data center or the SSDs in an all flash array. In some embodiments, storage devices 120 may share a backplane network, network switch(es), and/or other hardware and software components accessed through storage interface bus 108 and/or control bus 110. For example, storage devices 120 may connect to storage interface bus 108 and/or control bus 110 through a plurality of physical port connections that define physical, transport, and other logical channels for establishing communication with the different components and subcomponents for establishing a communication channel to host 102. In some embodiments, storage interface bus 108 may provide the primary host interface for storage device management and host data transfer, and control interface bus 110 may include limited connectivity to the host for low-level control functions.

In some embodiments, storage devices 120 may be referred to as a peer group or peer storage devices because they are interconnected through storage interface bus 108 and/or control bus 110. In some embodiments, storage devices 120 may be configured for peer communication among storage devices 120 through storage interface bus 108, with or without the assistance of host 102. For example, storage devices 120 may be configured for direct memory access using one or more protocols, such as non-volatile memory express (NVMe), remote direct memory access (RDMA), NVMe over fabric (NVMeOF), etc., to provide command messaging and data transfer between storage devices using the high-bandwidth storage interface and storage interface bus 108.

In some embodiments, storage devices 120 may be configured for peer communication using multi-master discovery and messaging compliant with a low-bandwidth interface standard. For example, storage devices 120 may be configured for packet-based messaging through control bus 110 using a low-bandwidth bus protocol, such as inter-integrated circuit (I2C), improved inter-integrated circuit (I3C), system management bus (SMBus), etc. Storage devices 120 may be interconnected by a common control bus to provide a low-bandwidth communication channel with host 102 and other system components to assist with power management, discovery, and access to external resources, such as temperature sensors, fan controllers, light emitting diode (LED) indicators, etc. For example, control bus 110 may connect storage devices 120 to a baseboard management controller (BMC) for monitoring the physical state of storage devices 120 for host 102. Storage devices 120 may be defined as peer storage devices based on their connection to a shared control bus 110.

In some embodiments, data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels). In some embodiments, data storage devices 120 may each be packaged in a housing, such as a multi-part sealed housing with a defined form factor and ports and/or connectors for interconnecting with storage interface bus 108 and/or control bus 110.

In some embodiments, a respective data storage device 120 may include a single medium device while in other embodiments the respective data storage device 120 includes a plurality of media devices. In some embodiments, media devices include NAND-type flash memory or NOR-type flash memory. In some embodiments, data storage device 120 may include one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

In some embodiments, each storage device 120 includes a device controller 130, which includes one or more processing units (also sometimes called CPUs or processors or microprocessors or microcontrollers) configured to execute instructions in one or more programs. In some embodiments, the one or more processors are shared by one or more components within, and in some cases, beyond the function of the device controllers. Media devices 140 are coupled to device controllers 130 through connections that typically convey commands in addition to data, and optionally convey metadata, error correction information and/or other information in addition to data values to be stored in media devices and data values read from media devices 140. Media devices 140 may include any number (i.e., one or more) of memory devices including, without limitation, non-volatile semiconductor memory devices, such as flash memory device(s).

In some embodiments, media devices 140 in storage devices 120 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

A data unit may describe any size allocation of data, such as host block, data object, sector, page, multi-plane page, erase/programming block, media device/package, etc. Storage locations may include physical and/or logical locations on storage devices 120 and may be described and/or allocated at different levels of granularity depending on the storage medium, storage device/system configuration, and/or context. For example, storage locations may be allocated at a host logical block address (LBA) data unit size and addressability for host read/write purposes but managed as pages with storage device addressing managed in the media flash translation layer (FTL) in other contexts. Media segments may include physical storage locations on storage devices 120, which may also correspond to one or more logical storage locations. In some embodiments, media segments may include a continuous series of physical storage location, such as adjacent data units on a storage medium, and, for flash memory devices, may correspond to one or more media erase or programming blocks. A logical data group may include a plurality of logical data units that may be grouped on a logical basis, regardless of storage location, such as data objects, files, or other logical data constructs composed of multiple host blocks.

In some embodiments, host or host system 102 may be coupled to data storage system 100 through a network interface that is part of host fabric network that includes storage interface bus 108 as a host fabric interface. In some embodiments, multiple host systems 102 (only one of which is shown in FIG. 1) are coupled to data storage system 100 through the fabric network, which may include a storage network interface or other interface capable of supporting communications with multiple host systems 102. The fabric network may include a wired and/or wireless network (e.g., public and/or private computer networks in any number and/or configuration) which may be coupled in a suitable way for transferring data. For example, the fabric network may include any means of a conventional data communication network such as a local area network (LAN), a wide area network (WAN), a telephone network, such as the public switched telephone network (PSTN), an intranet, the internet, or any other suitable communication network or combination of communication networks.

Host system 102, or a respective host in a system having multiple hosts, may be any suitable computer device, such as a computer, a computer server, a laptop computer, a tablet device, a netbook, an internet kiosk, a personal digital assistant, a mobile phone, a smart phone, a gaming device, or any other computing device. Host system 102 is sometimes called a host, client, or client system. In some embodiments, host system 102 is a server system, such as a server system in a data center, or a storage system, such as a storage array in a data center. In some embodiments, the one or more host systems 102 are one or more host devices distinct from a storage controller or storage node housing the plurality of storage devices 120. The one or more host systems 102 may be configured to store and access data in the plurality of storage devices 120. In some embodiments, host system 102 may support a plurality of virtual machines configured for accessing storage devices 120. For example, host system 102 may include a hypervisor application that enables host system 102 to dynamically map storage resources among storage devices 120 to a number of virtual hosts, including mapping one virtual host (or guest operating system) to one storage device, multiple virtual hosts to one storage device, one virtual host to multiple storage devices, and/or combinations thereof. Virtual host connections may introduce additional security risks for mapped storage devices and may increase the likelihood that peer storage devices are supporting host computing systems and applications that are unaware of one another and may not be able to rely solely on application or system-level security threat sharing.

Host system 102 may include one or more central processing units (CPUs) 104 for executing compute operations or instructions for accessing storage devices 120 through storage interface bus 108. In some embodiments, CPU 104 may include a processor and be associated with operating memory (not shown) for executing both storage operations and a storage interface protocol compatible with storage interface bus 108 and storage devices 120. In some embodiments, a separate storage interface unit (not shown) may provide the storage interface protocol and related processor and memory resources. From the perspective of storage devices 120, storage interface bus 108 may be referred to as a host interface bus and provides a host data path between storage devices 120 and host 102.

Host system 102 may include a BMC 106 configured to monitor the physical state of host 102, storage devices 120, and/or other components of data storage system 100. In some embodiments, BMC 106 may include processor, memory, sensor, and other resources integrated in BMC 106 and/or accessible over control bus 110. BMC 106 may be configured to measure internal variables within a housing, adjacent components, and/or from the components themselves within host 102 or data storage system 100, such as temperature, humidity, power-supply voltage, fan speeds, communication parameters, and/or operating system (OS) functions. BMC 106 may enable systems and components to be power cycled or rebooted as needed through control signals over control bus 110. In some embodiments, BMC 106 may be configured to receive status communication from storage devices 120 through control bus 110 during boot cycles, prior to initialization of host communication through storage interface bus 108.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

Figure 2:
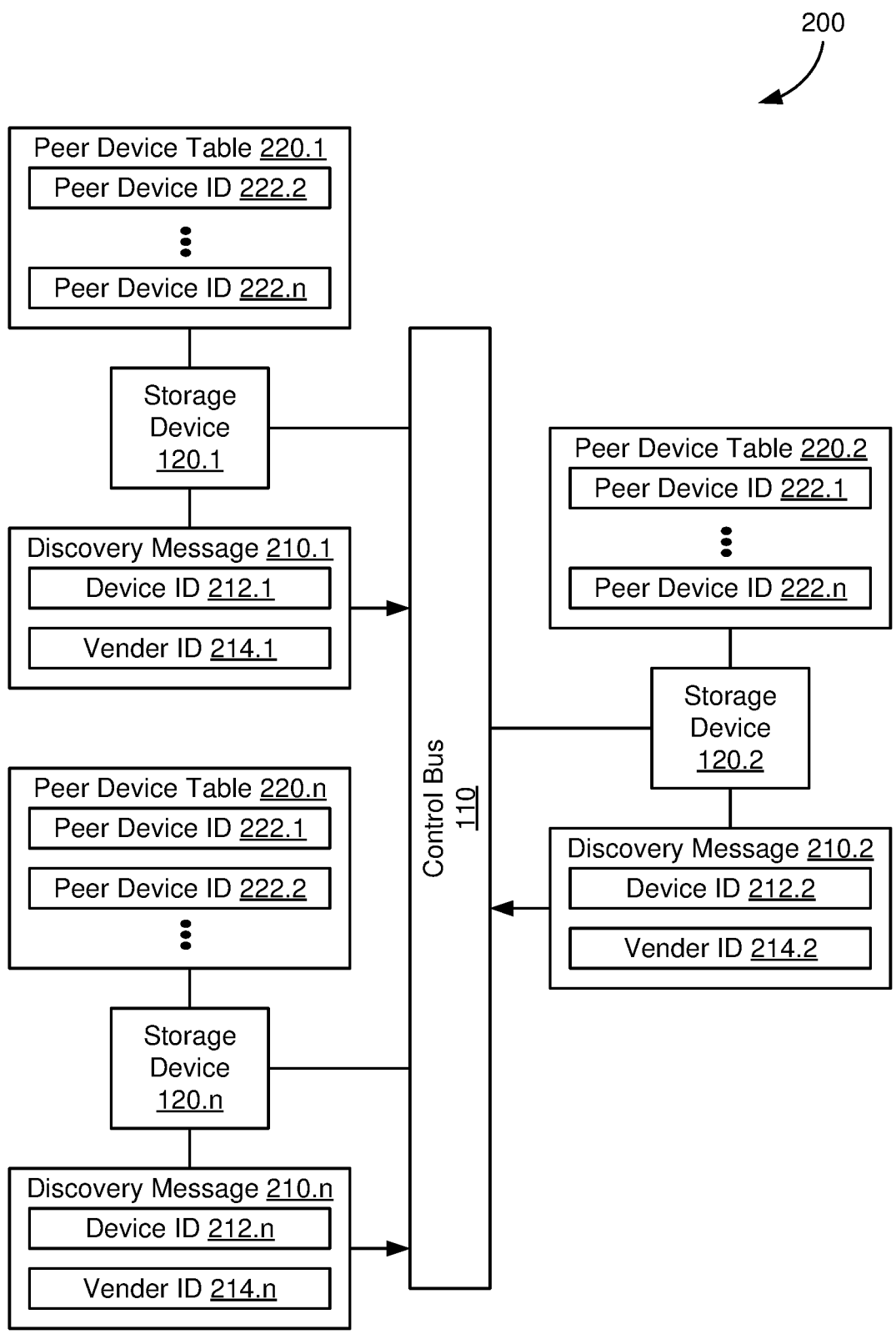
FIG. 2 schematically illustrates a peer discovery architecture that may be used by the multi-device storage system of FIG. 1.

FIG. 2 shows a schematic representation of an example storage system 200, such as multi-device data storage system 100 in FIG. 1, configured with a peer discovery architecture to support peer messaging through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components. Peer messaging through control bus 110 may be independent of any communication through a primary host interface or fabric interface, such as storage interface bus 108 in FIG. 1.

Each peer storage device 120.1-120.n connected to control bus 110 may be configured to initiate a discover message 210. Discovery message 210 may be broadcast to control bus 110 during start up or initialization. For example, storage device 120 may use the control bus protocol to establish priority or temporary master control of control bus 110 and send a broadcast message that is received by all other devices connected to control bus 110. Storage device 120.1 may thereby send discovery message 210.1 to storage devices 120.2-120.n and each peer storage device may do the same in turn during a system initialization, power cycle, or reboot. Each peer storage device 120 connected to control bus 110 may receive a discovery message from each other peer storage device 120.

In some embodiments, discovery message 210 may include a device identifier 212 and a vender identifier 214. Device identifier 212 may include a unique identifier for that storage device relative to all other devices connected to control bus 110. In some embodiments, device identifier 212 may include a product serial number and/or a unique address assigned to the particular storage device. For example, each device connected to control bus 110 may be assigned a 7 bit address that uniquely identifies that device on control bus 110. Messages intended for that storage device will include the address in the message sequence and only the storage device with the matching address will process the content of the message. Messages may also be sent with a reserved broadcast or general call address for the message to be received and processed by all devices.

Vender identifier 214 may include a group identifier that designates storage devices meeting a specific set of criteria, such as storage devices manufactured or sold by a particular company or configured in accordance with a specific peer messaging protocol or standard. For example, vender identifier 214 may include a numeric identifier for storage devices from a specific vendor that are enabled for peer messaging over the control bus. Vendor identifiers may be defined and assigned by particular manufacturers, in accordance with working group or standard agreement, or through other means to assure that vendor identifiers are unique and serve to properly identify storage devices compatible with specific peer messaging protocols and content.

In some embodiments, each storage device 120 may use discovery messages 210 received from peer storage devices to populate an internal data structure for storing the addresses of one or more peer storage devices. For example, each storage device 120 may maintain peer device table 220 in an internal memory location to list the addresses, device identifiers 212, and/or vendor identifiers 214 of each other peer storage device attached to control bus 110. In some embodiments, peer device table 220 may include a series, list, or array, of peer device identifier entries 222. For example, each time a discovery message with a different device identifier 212 is received (and includes a corresponding vendor identifier 214 that denotes the device as a peer storage device for messaging purposes), that device identifier 212 may be entered in peer device table 220 as a new peer device identifier entry 222. After all discovery messages 210 have been received, each storage device 120 may include a complete peer device table 220 with the information necessary to send messages to each other peer storage device over control bus 110.

Figure 3:
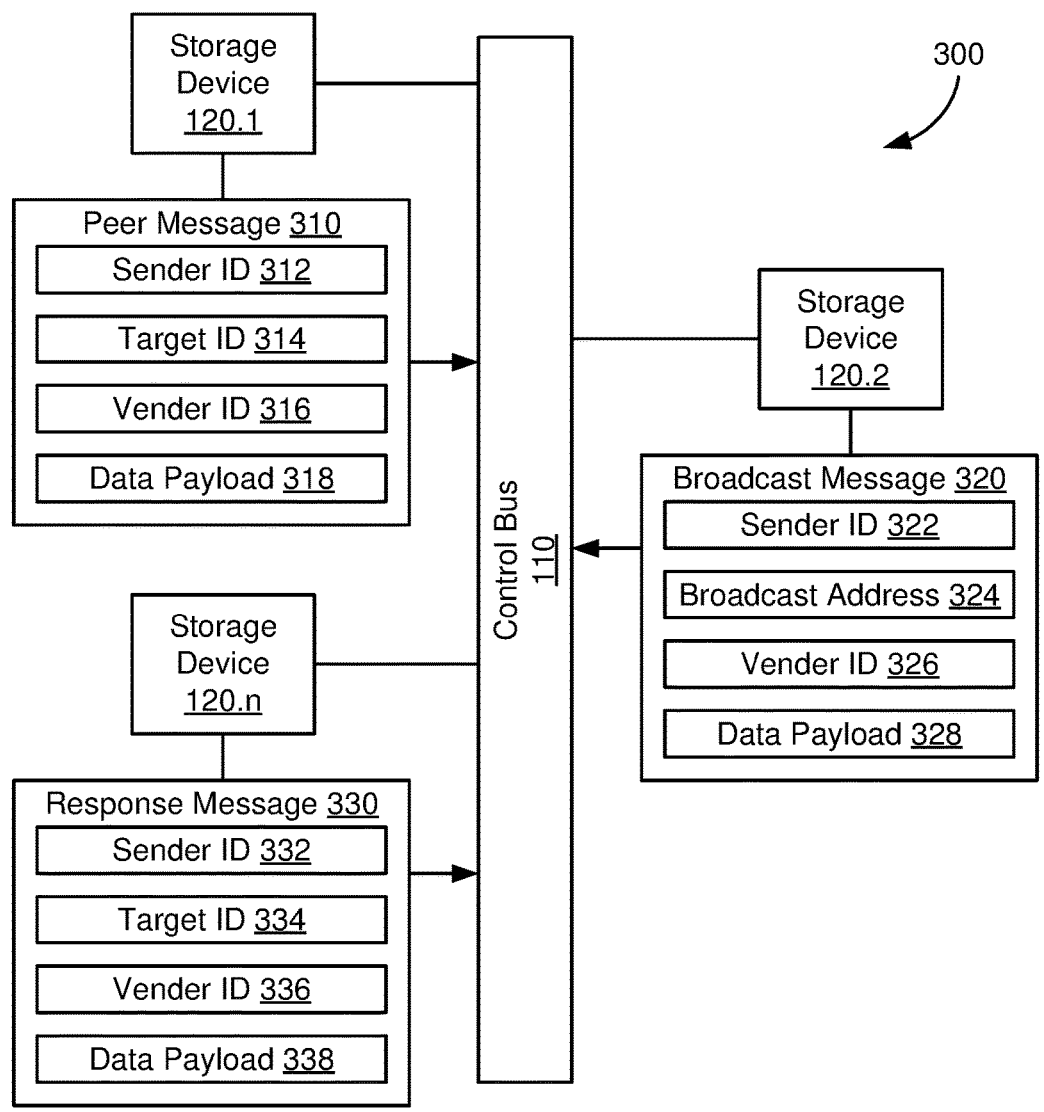
FIG. 3 schematically illustrates a peer messaging architecture that may be used by the multi-device storage system of FIG. 1.

FIG. 3 shows a schematic representation of an example storage system 300, such as multi-device data storage system 100 in FIG. 1, configured with a peer message architecture to support various types of peer messages 310, 320, 330 through control bus 110. Storage devices 120 may each be connected to control bus 110 for low-bandwidth communication with a low-level physical management and power control subsystem, such as BMC 106 in FIG. 1. In some embodiments, control bus 110 supports a multi-master, packet-based messaging system that may enable storage devices 120.1 to establish communication with peer storage devices through control bus 110, in addition to their communication with BMC 106 or other system components connected to control bus 110. For example, each storage device may be able to request or assert master control or priority in order to send messages through control bus 110 to peer storage devices operating as slaves. Peer messaging through control bus 110 may be independent of any communication through a primary host interface or fabric interface, such as storage interface bus 108 in FIG. 1.

Each peer storage device 120.1-120.n connected to control bus 110 may be configured to initiate one or more messages 310, 320, 330 using addresses and message syntax supported by control bus 110. While each example message is shown coming from a particular storage device 120, each storage device 120 may be configured to use any or all of the message types. Peer message 310 may be used by storage devices 120 to send direct messages to a target peer storage device, such as a message containing a threat notification, threat check, or device data for vulnerability analysis. Broadcast message 320 may be used by storage devices 120 to send messages to all peer storage devices at once, such as a message containing device data for vulnerability analysis or a threat notification. Response message 330 may be used by storage devices 120 to send messages back to a peer storage device that has sent a peer message, such as responding to a threat check by sending a threat notification or device data for vulnerability analysis. Note that response message 330 includes data payload and, in some embodiments, may require the sending storage device to have master control or priority and may be distinguished from simple acknowledgement messages that may be part of the slave's message handling protocol.

In some embodiments, peer message 310 may include a sender identifier 312, a target identifier 314, a vender identifier 316, and a data payload 318. For example, sender identifier 312 may include the device identifier for the sending storage device and/or control bus address of the sending storage device. Target identifier 314 may include the device identifier for the target storage device and/or control bus address of the target storage device. In some embodiments, target identifier 314 may include a device identifier that is separate from the control bus address used by devices on control bus 110 to determine the target device. Vender identifier 316 may include a vender identifier as described above with regard to vender identifiers 214 in FIG. 2. Data payload 318 may include data generated by the sending storage device, such as storage device 120.1, to be used by the target peer storage device for managing vulnerabilities. For example, data payload 318 may include data related to a threat notification, such as a security issue type and/or threat level. In some embodiments, data payload 318 may include a set of device data, such as boot time, firmware version, debug log data, or security metrics, selected for use in vulnerability analysis by the target storage device.

In some embodiments, broadcast message 320 may include a sender identifier 322, a broadcast address 324, a vender identifier 326, and a data payload 328. For example, sender identifier 322 may include the device identifier for the sending storage device and/or control bus address of the sending storage device. Broadcast address 324 may include a reserved address, header tag, or similar identifier to denote a broadcast message that should be sent to all devices on control bus 110. Vender identifier 326 may include a vender identifier as described above with regard to vender identifiers 214 in FIG. 2. Data payload 328 may include data generated by the sending storage device, such as storage device 120.1, to be used by one or more peer storage devices. For example, data payload 328 may include device data, such as firmware states, interface states, security logs, cryptography test data, boot logs, debug logs, and/or data extracted therefrom. In some embodiments, data payload 318 may include a threat notification for an identified security threat that storage device 120.2 is notifying the peer storage devices about.

In some embodiments, response message 330 may include a sender identifier 332, a target identifier 334, a vender identifier 336, and a data payload 338. Response message 330 may differ from peer message 310 in that it may be responsive to receipt of peer message 310. For example, peer message 310 may include a threat check for a device with resources to perform vulnerability analysis for another storage device and response message 330 may be the response to that threat check. Sender identifier 332 may include the device identifier for the sending storage device and/or control bus address of the sending storage device. Target identifier 334 may include the device identifier for the target storage device and/or control bus address of the target storage device, generally the storage device from which the recovery request was received. Vender identifier 336 may include a vender identifier as described above with regard to vender identifiers 214 in FIG. 2. Data payload 338 may include a threat notification if storage device 120.n is aware of an internal security threat or a set of device data for vulnerability analysis if storage device 120.n is not aware of an internal security threat.

Figure 4:
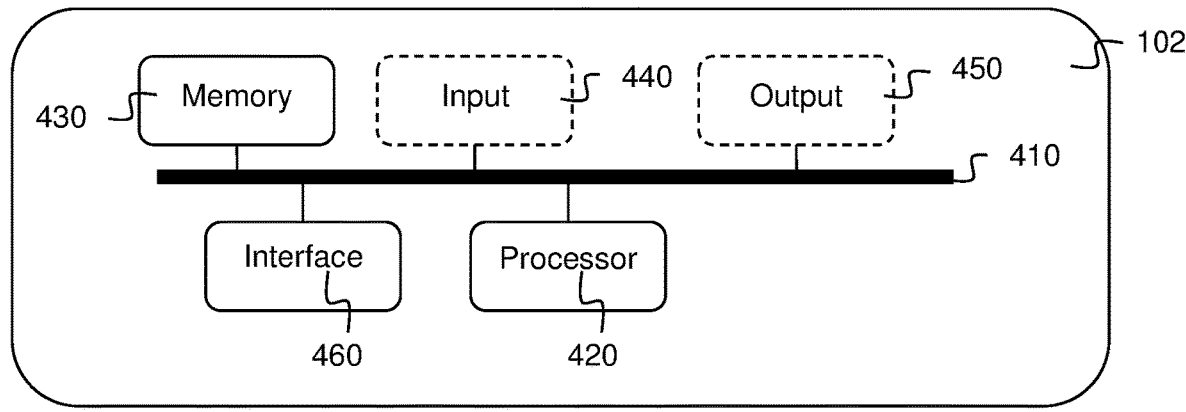
FIG. 4 schematically illustrates a host node of the multi-device storage system of FIG. 1.

FIG. 4 shows a schematic representation of an example host system 102. Host system 102 may comprise a bus 410, a processor 420, a local memory 430, one or more optional input units 440, one or more optional output units 450, and a communication interface 460. Bus 410 may include one or more conductors that permit communication among the components of host 102. Processor 420 may include any type of conventional processor or microprocessor that interprets and executes instructions. Local memory 430 may include a random access memory (RAM) or another type of dynamic storage device that stores information and instructions for execution by processor 420 and/or a read only memory (ROM) or another type of static storage device that stores static information and instructions for use by processor 420 and/or any suitable storage element such as a hard disc or a solid state storage element. An optional input unit 440 may include one or more conventional mechanisms that permit an operator to input information to host 102 such as a keyboard, a mouse, a pen, voice recognition and/or biometric mechanisms, etc. Optional output unit 450 may include one or more conventional mechanisms that output information to the operator, such as a display, a printer, a speaker, etc. Communication interface 460 may include any transceiver-like mechanism that enables host 102 to communicate with other devices and/or systems. In some embodiments, communication interface 460 may include one or more peripheral interfaces, such as a PCIe interface for connecting to storage devices 120. In storage systems using a storage controller, storage network interface controller, or similar intermediary system between storage devices 120 and host 102, the storage controller, storage network interface controller, or similar intermediary system may be configured similarly to example host 102 in FIG. 4.

Figure 5:
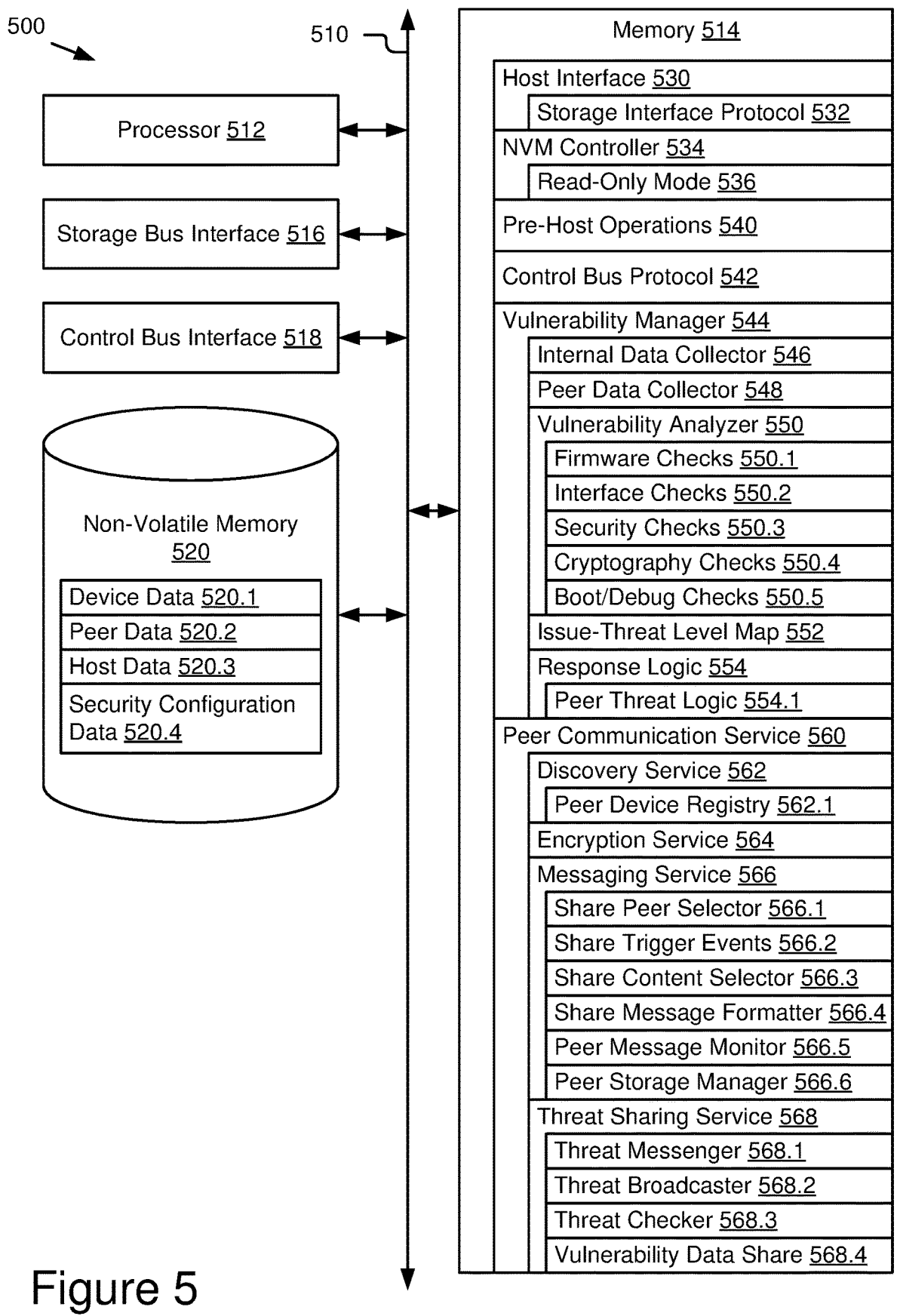
FIG. 5 schematically illustrates some elements of the storage devices of FIGS. 1-4 in more detail.

FIG. 5 schematically shows selected modules of a storage device 500 configured for peer messaging, such as storage devices 120. Storage device 500 may incorporate elements and configurations similar to those shown in FIGS. 1-3. For example, storage device 500 may be configured as a storage device 120 in a set of peer storage devices interconnected by a control bus and including a host or storage bus interface for data transfer to and from a host in a multi-device data storage system.

Storage device 500 may include a bus 510 interconnecting at least one processor 512, at least one memory 514, and at least one interface, such as storage bus interface 516 and control bus interface 518. Bus 510 may include one or more conductors that permit communication among the components of storage device 500. Processor 512 may include any type of processor or microprocessor that interprets and executes instructions or operations. Memory 514 may include a random access memory (RAM) or another type of dynamic storage device that stores information and instructions for execution by processor 512 and/or a read only memory (ROM) or another type of static storage device that stores static information and instructions for use by processor 512 and/or any suitable storage element such as a hard disc or a solid state storage element.

Storage bus interface 516 may include a physical interface for connecting to a host using an interface protocol that supports storage device access. For example, storage bus interface 516 may include a PCIe, SATA, SAS, or similar storage interface connector supporting NVMe access to solid state media comprising non-volatile memory devices 520. Control bus interface 518 may include a physical interface for connecting to a control bus using a low-bandwidth interface protocol for low-level control messaging among computing components. For example, control bus interface 518 may include a I2C, I3C, SMBus, or similar bus interface connector supporting component-to-component messaging, such as multi-master, packet-based messaging over a two-wire bus.

Storage device 500 may include one or more non-volatile memory devices 520 configured to store host data. For example, non-volatile memory devices 520 may include a plurality of flash memory packages organized as an addressable memory array. In some embodiments, non-volatile memory devices 520 may include NAND or NOR flash memory devices comprised of single level cells (SLC), multiple level cell (MLC), or triple-level cells. In some embodiments, non-volatile memory 520 may include a magnetic storage medium, such as one or more rotating disks or magnetic tape.

Storage device 500 may include a plurality of modules or subsystems that are stored and/or instantiated in memory 514 for execution by processor 512 as instructions or operations. For example, memory 514 may include a host interface 530 configured to receive, process, and respond to host data requests from client or host systems. Memory 514 may include a non-volatile memory (NVM) controller 534 configured to manage read and write operations to non-volatile memory devices 520. Memory 514 may include pre-host operations configured for low-level operating system and firmware functions within storage device 500 that are executed independent of host commands, particularly during device power up, initialization, power cycling, or ungraceful shutdown (UGSD). Memory 514 may include a control bus protocol configured manage communication over control bus interface 518 in accordance with a determined protocol or standard. Memory 514 may include vulnerability manager 544 configured to manage security threats for storage device 500 based on vulnerability analysis and communication with peer storage devices about security threats. Memory 514 may include a peer communication service 560 configured for communication among storage devices attached to the same control bus as storage device 500, including a threat sharing service 568.

Host interface 530 may include an interface protocol and/or set of functions and parameters for receiving, parsing, responding to, and otherwise managing host data requests from a host. For example, host interface 530 may include functions for receiving and processing host requests for reading, writing, modifying, or otherwise manipulating data blocks and their respective client or host data and/or metadata in accordance with host communication and storage protocols. In some embodiments, host interface 530 may enable direct memory access and/or access over NVMe protocols through storage bus interface 516 to host data units 520.3 stored in non-volatile memory devices 520. For example, host interface 530 may include host communication protocols compatible with PCIe, SATA, SAS, and/or another bus interface that supports use of NVMe protocols for data access to host data 520.3.

In some embodiments, host interface 530 may include a plurality of hardware and/or software modules configured to use processor 512 and memory 514 to handle or manage defined operations of host interface 530. For example, host interface 530 may include a storage interface protocol 532 configured to comply with the physical, transport, and storage application protocols supported by the host for communication over storage bus interface 516. For example, storage interface protocol 532 may include both PCIe and NVMe compliant communication, command, and syntax functions, procedures, and data structures. In some embodiments, storage device 500 may be configured to send and/or make available security threat notifications to one or more hosts using host interface 530 and storage interface protocol 532 for communicating drive state information. For example, storage device 500 may provide a read-only mode state change notification that includes a security flag, security threat type, and/or similar parameters conveying the reason for the change in operating mode. In some embodiments, host interface 530 may include additional modules (not shown) for command handling, buffer management, storage device management and reporting, and other host-side functions.

NVM controller 534 may include an interface protocol and/or set of functions and parameters for reading, writing, and deleting data units in non-volatile memory devices 520. For example, host interface 530 may include functions for executing host data operations related to host storage commands received through host interface 530. For example, PUT or write commands may be configured to write host data units to non-volatile memory devices 520. GET or read commands may be configured to read data from non-volatile memory devices 520. DELETE commands may be configured to delete data from non-volatile memory devices 520, or at least mark a data location for deletion until a future garbage collection or similar operation actually deletes the data or reallocates the physical storage location to another purpose. In some embodiments, NVM controller 534 may include flash translation layer (FTL) management, data state machine, read/write buffer management, NVM device interface protocols, NVM device configuration/management/maintenance, and other device-side functions.

In some embodiments, NVM controller 534 may be configured to allocate a portion of the memory locations in non-volatile memory devices 520 for storing data other than host data 520.3. For example, NVM controller 534 may allocate device data 520.1 as memory locations reserved for internal device data, including device configuration, state parameters, and internal operations data, such as various logs. In some embodiments, NVM controller 534 may allocate peer data 520.2 as memory locations reserved for internal device data received from and about peer storage devices, including internal operation data, such as data for use in vulnerability analysis, from those peer storage devices. In some embodiments, storage space allocated to device data 520.1 and/or peer data 520.2 may include device data partitions and/or peer data partitions excluded from the storage capacity made available to host data 520.3, such as overprovisioned storage locations hidden from the host for use storing internal operation data, FTL tables, replacing bad blocks, etc. In some embodiments, the configuration data in device data 520.1 and/or peer data 520.3 may include security configuration data 520.4, such as a table or similar data structure assigning security threat levels and/or responses to various security threat types. For example, storage device 500 may receive security configuration data 520.4 during manufacture, provisioning, and/or from a host or storage controller configuration operation and store it to a configuration page in non-volatile memory 520 for device data 520.1.

In some embodiments, NVM controller 534 may use a plurality of device states to manage the storage operations of storage device 500. For example, NVM controller 534 may use power states, workload states, thermal states, security states, operating modes, and corresponding state machines to determine when and how different storage and background operations are executed. This device state information may also be available to hosts, storage controllers, and/or peer storage devices through their respective interfaces to support management, control, and/or coordination among systems. In some embodiments, operating modes may correspond to composite decisions based on the various state machines. For example, operating states may include a normal operating mode (corresponding to no state needing to modify the overall operations of the storage device), a low power mode (corresponding to power, thermal, and/or workload states decreasing operating power of the storage device), a read-only mode 536 (corresponding to security, workload, and/or background states limiting storage operations to read-based commands only, no writing to non-volatile memory 520), a data protect mode (corresponding to security, workload, and/or background states prohibiting storage operations that read from or write to host data 520.3), a pre-host operation mode, etc. Other operating modes and corresponding sets of state criteria are possible.

Pre-host operations 540 may include functions and parameters for managing low-level device operations for storage device 500. For example, pre-host operations 540 may include operations executed during startup or initialization of storage device 500 prior to establishing host communications through host interface 530, denoted as a pre-host operation state or mode. In some embodiments, pre-host operations 540 may also include functions and parameters for managing low-level device operations during shutdown, power cycle, error, or failure states where host communication may become unavailable temporarily. For example, pre-host operations 540 may include read only memory, boot loader, firmware, and/or operating system operations that govern the basic operation of storage device 500 as a set of interconnected computing components and interfaces, independent of the higher-level host data storage functions.

Control bus protocol 542 may include interfaces, functions, and parameters for communication within the host or an associated baseboard management controller (BMC) using multi-master discovery and messaging compliant with a low-bandwidth interface standard. For example, storage device 500 may be configured for packet-based messaging through control bus interface 518 using a low-bandwidth bus protocol, such as I2C, I3C, SMBus, etc. Control bus protocol 542 may include a plurality of hardware and/or software modules configured to use processor 512, memory 514, and control bus interface 518 for communication with host components, including peer storage devices on the same control bus, using a control bus protocol supported by the connected control bus. In some embodiments, control bus protocol 542 may provide a low-bandwidth communication channel with the host and other system components to assist with power management, discovery, and access to external resources, such as temperature sensors, fan controllers, light emitting diode (LED) indicators, etc. For example, control bus interface 518 may connect storage device 500 to a BMC for monitoring the physical state of storage device 500. In some embodiments, control bus protocol 542 may provide the discovery and messaging functions used by peer communication service 560.

Vulnerability manager 544 may include interfaces, functions, parameters, and data structures for managing security vulnerabilities and identified security threats for data storage device 500 and/or peer data storage devices. For example, vulnerability manager 544 may monitor firmware, external device interfaces, security check algorithms, cryptography check algorithms, and/or boot, trace, and debug logs for conditions that correspond to possible and/or active security threats, such as malware, unauthorized access (hackers), and/or other malicious software, such as ransomware, viruses, worms, trojans, bots, rootkits, spyware, etc. Vulnerability manager 544 may be configured to collect internal device data and/or the internal device data of peer storage devices, analyze the collected data, and identify security threats. In some embodiments, vulnerability manager 544 may determine responses to those threats based on security configuration data 520.4. For example, vulnerability manager 544 may correlate security issue types to threat levels and corresponding responses, such as notifying peers and/or hosts and entering read-only mode 536. Vulnerability manager 544 may use peer communication service 560 to communicate with peer data storage devices regarding security threats, which may include notification of identified threats and/or sharing of underlying device data to allow peers to check one another for security threats.

In some embodiments, vulnerability manager 544 may include a plurality of hardware and/or software modules configured to use processor 512 and memory 514 to handle or manage defined operations of vulnerability manager 544. For example, vulnerability manager 544 may include internal data collector 546 configured to collect internal device data for analyzing the vulnerabilities and/or identifying active threats for storage device 500. Vulnerability manager 544 may include a peer data collector 548 configured to collect peer device data through peer communication service 560 for analyzing the vulnerabilities and/or identifying active threats for peer storage devices. Vulnerability manager 544 may include a vulnerability analyzer 550 configured to analyze the collected data for storage device 500 and/or its peer storage devices for vulnerabilities and/or active security threats. Vulnerability manager 544 may include a security issue-threat level map 552 configured to support peer threat logic 554.1 and response logic 554 for determining responses to security threats. Vulnerability manager 544 may include peer threat logic 554.1 configured to determine handling of identified security threats to peer storage devices. Vulnerability manager 544 may include response logic 556 configured to determine responses to identified security threats, whether internal security threats or peer security threats, based on security configuration data 520.4 and/or security issue-threat level map 552.

Internal data collector 546 may include interfaces, functions, parameters, and data structures for collecting internal device operation, state, and/or log data for use in determining vulnerabilities and active security threats for storage device 500. For example, internal data collector 546 may be an aggregator and/or provide access to parameters, state information, and log data in device data 520.1 for vulnerability analyzer 550. In some embodiments, internal data collector 546 may operate on a periodic basis to collect relevant sets of device data and/or may collect data based on the needs of vulnerability analyzer 550 and/or threat sharing service 568. For example, internal data collector 546 may operate on a regular collection interval to aggregate data and/or respond to data queries from vulnerability analyzer 550 and/or threat sharing service 568. In some embodiments, internal data collector 546 may be configured to collect and organize data according to specific checks conducted by vulnerability analyzer 550 and/or specific data sets to be shared with one or more peer storage devices, which may similarly align with specific checks conducted by peer storage devices.

Peer data collector 548 may include interfaces, functions, parameters, and data structures for collecting peer device operation, state, and/or log data for use in determining vulnerabilities and active security threats for those peer storage devices, which, in turn, may represent security threats to storage device 500. For example, peer data collector 548 may be an aggregator for parameters, state information, and log data received from peer storage devices through threat sharing service 568. In some embodiments, peer data collector 548 may operate on a periodic basis to request peer device data through threat sharing service 568 and/or may receive peer device data broadcast or sent to messaging service 566. For example, peer data collector 548 may operate on a regular collection interval to send peer data requests and/or may receive peer device data shares from peer storage devices on a schedule determined by the peer storage devices. In some embodiments, peer data collector 548 may be configured to collect and organize peer device data according to specific checks conducted by vulnerability analyzer 550 and/or specific data sets shared by one or more peer storage devices. In some embodiments, peer data collector 548 may receive peer device data from multiple peer storage devices and organize the data according to peer device identifiers for analysis. For example, storage device 500 may be configured as a master security device among the peer storage devices and collect and analyze data from each other peer storage or may conduct a particular type of analysis for each peer storage device, such as firmware version checks, open interface checks, or boot time checks. Other configurations are possible, such as partnering, round robin, or other schemes for storage device 500 to receive and analyze data from one or more peer storage devices.

Vulnerability analyzer 550 may include internal interfaces, functions, parameters, and data structures for analyzing security vulnerabilities of storage device 500 and/or peer storage devices for identifying security threats. For example, vulnerability analyzer 550 may include logic for evaluating one or more device data sets from internal data collector 546 and/or peer data collector 548 for characteristics corresponding to security threats, such as malicious software or unauthorized access. In some embodiments, vulnerability analyzer 550 may evaluate one or more device data sets against one or more logical rule sets for identifying security threats and returning a security threat type and/or other parameters related to the security threat (such as an open port identifier, outdated firmware version, relevant excerpt from log data, etc.).

In some embodiments, vulnerability analyzer 550 may be configured for one or more firmware checks 550.1 configured to evaluate storage device firmware to identify security threats. For example, firmware checks 550.1 may include a check of an internal firmware version number against a firmware age threshold and/or earlier firmware versions known to have security vulnerabilities. As another example, the firmware authentication process (based on firmware update logs) may be evaluated to determine whether the loaded firmware is valid. In some embodiments, the firmware versions of a set of homogenous peer storage devices may be collected and compared to determine whether there are differences among versions that may indicate a security vulnerability.

In some embodiments, vulnerability analyzer 550 may be configured for one or more interface checks 550.2 configured to evaluate external ports that may enable communication with the storage device. For example, interface checks 550.2 may include evaluation of the lock, unlock, and/or connection states of one or more interfaces, including storage bus interface 516, control bus interface 518, and/or any network ports, to determine whether they align with the desired configuration of the storage device or one or more interfaces include open or unlocked states that are not necessary for the desired configuration. In some embodiments, the interface configurations of a set of homogenous peer storage devices may be collected and compared to determine whether there are differences among the interface/port configurations that may indicate a security vulnerability.

In some embodiments, vulnerability analyzer 550 may be configured for one or more security checks 550.3 configured to evaluate known malicious software signatures within the storage device firmware and/or other indicators of known security risks. For example, security checks 550.3 may include internal security scans and auditing of security logs to help understand whether the device has been attacked in the past. These security checks may be developed over time based on known viruses, worms, and other malicious software, particularly past security breaches that have targeted storage devices and/or similar computer subsystems, and governed by a security scanning service external to storage device 500.

In some embodiments, vulnerability analyzer 550 may be configured for one or more cryptography checks 550.4 to evaluate the security of cryptographic subsystems of storage device 500 for encrypting stored data and/or data transmission, including encryption of host and/or device (system) data. For example, pseudo random functions (PRFs) may be used for generating random seed values for hash functions and encryption systems and cryptography checks 550.4 may test whether the PRFs exhibit requisite entropy for a threshold level of randomness. Other cryptographic health tests and cryptographic metrics may be included in cryptography checks 550.4 to find vulnerabilities in known processes, such as validation of cryptographic function values and metrics related to cryptographic outputs.

In some embodiments, vulnerability analyzer 550 may be configured for one or more boot/debug checks 550.5 to evaluate boot logs, debug logs, trace logs, and other operational log data for anomalies indicating security threats. For example, boot time may be checked against peer boot times, historical boot times, and/or legitimate range values for storage device 500 to determine variances (particularly long boot times) that may indicate malicious software loading or otherwise interfering with the boot process. Similarly, debug logs, system trace logs, and other operation log data may be searched for patterns that vary from historical and/or peer baselines or specifically indicate a known exploit. Other checks for vulnerability analyzer 550 may be possible and the example checks provided are not intended to be exhaustive.

Security issue-threat level map 552 may include interfaces, functions, parameters, and data structures for mapping security issues identified by vulnerability analyzer 550 and/or received through threat sharing service 568 to security threat levels and/or corresponding responses. For example, security issue-threat level map 552 may include a lookup table or similar data structure that includes various security issue types and maps them to fixed number of threat levels, such as high/medium/low, 1-5, percentage risk, etc. Each threat level may then be mapped to a specific security threat response. For example, a low threat level may correspond to host notification only, such as sending a notification message for system administrators or adding a log entry to a status log used for determining maintenance operations (such as updating firmware, updating interface settings, etc.); a medium threat level may correspond to peer notification, such as sending a notification broadcast to peer storage devices to warn them of a potential or suspected threat to storage device 500; and a high threat level may correspond to entering read-only mode (in addition to the host and peer notifications) until a security fix is completed. In some embodiments, security issue-threat map 552 may be based on security configuration data 520.4 such that each storage device among the peer storage devices may have a different security configuration and set of responses for the different threat levels. For example, one storage device may enter read-only mode when any threat (low or higher) is detected, another storage device may enter read-only mode at a medium or higher threat level, and still another storage device may enter read-only mode only at the highest threat level (e.g., high).

Response logic 554 may include interfaces, functions, parameters, and data structures for executing one or more responses to different identified security issues. For example, response logic 554 may include one or more notification actions and/or one or more operating mode changes in response to different security issue types. In some embodiments, response logic 554 may trigger notification messages through host interface 530 and/or peer communication service 560, such as host notification messages and/or peer broadcast messages for identified security threats. In some embodiments, response logic 554 may trigger operating mode changes, such as switching to read-only mode or data protect mode, to prevent malicious software or unauthorized access from changing or accessing stored data. In some embodiments, security configuration data 520.4 may map security threat types and/or threat levels to responsive changes in operating mode. For example, based on a security threat level or state being identified as low, medium, or high, the operating mode may be maintained at normal operating mode (or whatever the current mode is) for low (though invoking peer and/or host threat notifications), changed to read-only mode 536 for medium, and changed to data protect mode for high.

In some embodiments, response logic 554 may differentiate responses for internal threats to storage device 500 from responses for security threats identified for peer storage devices. For example, security configuration data 520.4 may identify different responses for the same threat level depending on whether the threat originates in storage device 500 or a peer storage device. In some embodiments, response logic 554 may include peer threat logic 554.1 configured to determine responses to identified security threats for peer storage devices. Peer threat logic 554.1 may include responses to security threats determined by vulnerability analyzer 550 (based on peer device data received through threat sharing service 568) and security threats determined from peer threat notifications received through threat sharing service 568.

Peer communication service 560 may include an interface protocol and set of functions and parameters for discovering peer storage devices, sending and receiving messages with those peer storage devices, and/or managing power use across those peer storage devices. For example, peer communication service 560 may include functions for utilizing low-bandwidth communications through control bus interface 518 using control bus protocol 542. In some embodiments, peer communication service 560 may include management of peer data 520.2 in non-volatile memory devices 520 for storing peer device data to support vulnerability manager 544.

In some embodiments, peer communication service 560 may include a plurality of hardware and/or software modules configured to use processor 512 and memory 514 to handle or manage defined operations of peer communication service 560. For example, peer communication service 560 may include a discovery service 562, an encryption service, a messaging service 566, and/or a threat sharing service 568. For example, discovery service 562 may be configured to discover peer storage devices on a shared control bus and store their addresses for use by messaging service 566. Encryption service 564 may be configured to establish secure (encrypted) peer communications over the control bus for use by messaging service 566. Messaging service 566 may be configured to send and receive one-to-one and/or broadcast messages to and from peer storage devices over the shared control bus. Threat sharing service 568 may be configured to request and receive data from peer storage devices through messaging service 566 to assist with vulnerability management for storage device 500 and/or the peer storage devices as a group.

Discovery service 562 may include data structures, functions, and interfaces for discovering peer devices on a control bus and determining peer device addresses for use by peer communication service 560. For example, during initialization or startup of storage device 500, discovery service 562 may broadcast its device identifier or address and receive similar broadcasts from other devices to accumulate device information for other devices on the control bus. In some embodiments, discovery service 562 may include a peer device registry 562.1 configured to store storage device identifiers, control bus addresses, and/or other peer storage device information to establish and support communication with peer storage devices. For example, peer device registry 562.1 may include a data table or other data structure in memory 514 and/or device data 520.1 that includes a plurality of device identifier entries associated with corresponding control bus addresses. In some embodiments, discovery service 562 may include a device ID broadcaster configured to determine the storage device identifier and/or control bus address for storage device 500 and broadcast a message on the control bus to enable other devices on the control bus to discover storage device 500. For example, the device ID broadcaster may be triggered during ROM, boot loader, or firmware execution at startup or initialization of storage device 500, in response to a discovery message from another device, and/or another device discovery trigger in accordance with control bus protocol 542. In some embodiments, discovery service 562 may include a peer ID receiver configured to monitor communications through control bus interface 518, identify discovery broadcasts from other storage devices, and add a corresponding device identifier entry in peer device registry 520.1. For example, control bus protocol 542 may define syntax for broadcast messages, such as a broadcast address, a tag or similar parameter for designating a discovery broadcast, and data payload including the storage device identifier, control bus address, vendor identifier, etc. and the peer ID receiver may be configured according to parse messages meeting that syntax to extract peer storage device identifiers.

Encryption service 564 may include data structures, functions, and interfaces for encrypting and decrypting peer messaging data for sharing and/or storage. For example, encryption service 564 may include encryption key exchange with peer storage devices to establish encrypted messaging between peer storage devices. In some embodiments, encryption service 564 may use a Diffie-Hellman key exchange algorithm (DH) for establishing secure tunnel communications over the multi-master control bus. For example, peer storage devices may establish secure peer communication with each other through a secure tunnel by using DH to create a shared key for encryption and decryption. The peer storage devices may authenticate each other by exchanging derived internal secret data, such as data derived with a pre-shared key, created in a DH compliant process. For example, each storage device from the same vendor may store an internal vendor key which is equal in all the storage devices and configured at manufacture. This key may be used for the authentication process on each side based on the exchange of derived hash values. In some embodiments, encryption service 564 may implement a selected encryption algorithm and standard for encrypting message data, such as advanced encryption standard (AES)-128 or another encryption standard.

Messaging service 566 may include data structures, functions, and interfaces for sending and receiving messages to and from peer devices over the control bus and may also be referred to as a peer messaging service. For example, messaging service 566 may implement control bus protocol 542 to send and receive messages with other devices identified through discovery service 562. In some embodiments, messaging service 566 may send packetized data payloads over the control bus using block write and block read commands between buffers in the peer storage devices. In some embodiments, peer messaging service 560 may be used via another peer communication channel, such as RDMA buffer communication over storage bus interface 516 in accordance with storage interface protocol 532, when peer communications through storage bus interface 516 are available.

In some embodiments, messaging service 566 may include a share peer selector 566.1 configured to select a target or destination peer storage device to receive a message. For example, share peer selector 566.1 may include a parameter setting or algorithm for selecting a peer storage device to receive a particular peer message. In some embodiments, messaging service 566 may include share trigger events 566.2 configured to determine when selected message data is sent to one or more peer storage devices. For example, share trigger events 566.2 may include a plurality of rule-based conditions for triggering notification of security threats, threat checks, and/or vulnerability data sharing, such as based on response logic 554 and/or peer data collector 548. In some embodiments, messages or broadcasts for peer data collection and/or threat checks may occur on a regular schedule based on periodic update cycles and corresponding operating periods. In some embodiments, messaging service 566 may include a share content selector 566.3 configured to select the set of parameters to include in the payload of messaging service 566. For example, share content selector 566.3 may include a security threat type and/or threat level for a threat notification message or a set of device data for vulnerability data share messages. In some embodiments, messaging service 566 may include a share message formatter 566.4 configured to format a peer message in accordance with control bus protocol 542 to include the control bus address of the target peer storage device and the selected content in the data payload. For example, share message formatter 566.4 may generate or determine a header containing a control bus address and a read/write flag, followed by message payload and/or other parameters, such as command codes and/or error codes, to convey the selected threat notification and/or vulnerability data for analysis.

In some embodiments, messaging service 566 may include a peer message monitor 566.5 configured to monitor control bus interface 518 for messages from peer storage devices addressed to storage device 500 (directly or via broadcast). For example, peer message monitor 566.5 may receive peer messages over the control bus that are initiated by peer storage devices and/or responsive to messages sent by messaging service 566. Peer message monitor 566.5 may parse received messages to determine whether further action is necessary, such as passing security threat notifications and/or peer device data for vulnerability analysis to vulnerability manager 544, peer storage manager 566.6, and/or threat sharing service 568. In some embodiments, messaging service 566 may include a peer storage manager 566.6 configured to store peer device data received from peer storage devices for use in vulnerability analysis and/or operation of vulnerability manager 544. For example, peer storage manager 566.6 may receive peer device data from one or more peer storage devices and store the data in peer data 520.2.

Threat sharing service 568 may include data structures, functions, and interfaces for sharing security and vulnerability related information with peer storage devices using messaging service 566. For example, threat sharing service 568 may enable storage device 500 to coordinate with peer storage devices through messaging service 566 to communicate security threats and share device data to allow other devices to check for security threats and vulnerabilities. The peer group may manage their vulnerability checks and security threat notifications collectively and without host intervention or requiring host availability. In some embodiments, one of the peer storage devices may act as master security device for collecting device data from the peer group for vulnerability analysis. In some embodiments, each peer storage device may collect and analyze device data for itself and/or from one or more other peer storage device to provide distributed vulnerability analysis and/or multiple checks (in case a compromised peer device is no longer running security checks—such as when processing and/or memory resources have been disrupted by a security threat).

In some embodiments, threat sharing service 568 may include a threat messenger 568.1 configured to send security threat notification messages to peer storage devices. For example, responsive to vulnerability manager 544 detecting a security threat and determining that the threat level warrants peer notification, vulnerability manager 544 may pass parameters, such as security issue type and security threat level, for at least one notification message to a target peer storage device to threat messenger 568.1. Threat messenger 568.1 may include logic to selectively invoke messaging service 566 for addressing, formatting, and sending threat notification messages to a desired subset of peer storage devices determined by response logic 554. In some embodiments, threat sharing service 568 may include a threat broadcaster 568.2 configured to operate similarly to threat messenger 568.1, except that it uses the broadcast function of messaging service 566 to send the threat notification to all peer storage devices at the same time. For example, for some threat levels and/or security threat types, response logic 554 may indicate that all peer storage devices should be notified.

In some embodiments, threat sharing service 568 may include a threat checker 568.3 configured to send threat check messages to peer storage devices. For example, storage device 500 may use threat checker 568.3 to periodically check with peer storage devices to update security threat status. Threat checker 568.3 may include logic to selectively invoke messaging service 566 for addressing, formatting, and sending threat check messages to a desired peer storage device being monitored by vulnerability manager 544. In some embodiments, threat checker 568.3 may be used by a master security device to coordinate when security checks are made by peer storage devices and/or initiate vulnerability data sharing to analyze vulnerabilities for potential security threats. Threat check messages may require a response message from the peer storage device and may treat non-responsive peer storage devices as security issues for response logic 554.

In some embodiments, threat sharing service 568 may include a vulnerability data share service 568.4. As discussed above, vulnerability manager 544 may be configured to collect sets of peer device data and/or send sets of internal device data for analysis by peer storage devices. Vulnerability manager 544 may initiate and/or respond to vulnerability data share service 568.4 for using messaging service 566 to communicate collected data sets among peer storage devices. For example, vulnerability manager 544 may pass a set of device data for vulnerability analysis to vulnerability data share service 568.4 and vulnerability data share service 568.4 may include logic to selectively invoke messaging service 566 for addressing, formatting, and sending vulnerability data share messages to a desired peer storage device. Similarly, messaging service 566 may receive vulnerability data share messages from peer storage devices and vulnerability data share 568.4 may include logic for parsing the data payload of the received message for storage to peer data 520.2 and/or processing by vulnerability manager 544.

Figure 6:
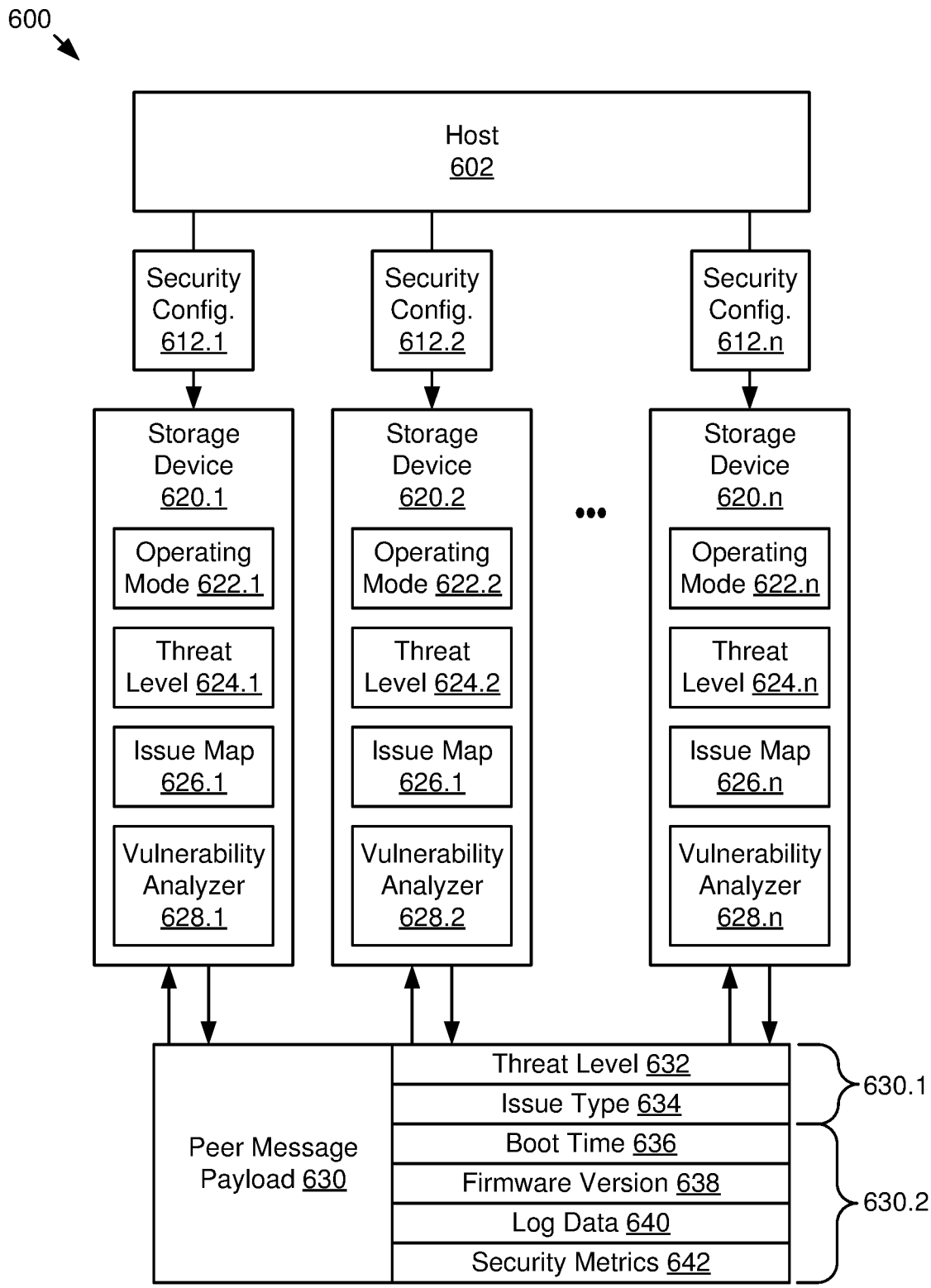
FIG. 6 schematically illustrates an example vulnerability management configuration for the storage devices of FIGS. 1-5.

FIG. 6 shows a storage system 600 configured for peer security vulnerability management using peer messaging, such as through a control bus interface. For example, storage system 600 may include configurations of hosts and storage devices as described above for FIGS. 1-5. Host 602 may be configured for storing host data on storage devices 620.1-620.*n*. In some embodiments, host 602 may also have a role in security management for storage devices 620, such as providing security scans and responding to security threats identified at the host level. In some embodiments, host 602 may provide security configurations 612.1-612.*n* for each storage device 620. For example, host 602 may determine, based on the type of host data stored in each storage device, the threat levels and corresponding responses that should be taken by each data storage device. In some embodiments, each storage device 620 may store their respective security configuration 612 in non-volatile memory and use it to populate issue maps 626 for governing threat responses. Security configuration 612 may be different for each storage device 620.

As described with regard to FIGS. 1-5, storage devices 620 may use peer messaging to coordinate vulnerability analysis and security threat management and response among them. For example, storage devices 620 may have an operating mode 622.1-622.*n*, such as a normal operating mode, and may be configured to selectively change their operating mode in response to security threats. In some embodiments, storage devices 620 may monitor security threat levels 624.1-624.*n* to determine security responses. For example, each storage device 620 may classify identified security threats as low, medium, or high threat levels and each threat level may correspond to one or more responses, such as host or peer notifications and/or changes in operating modes. In some embodiments, storage devices 620 may include issue maps 626.1-626.*n*, such as a security issue to threat level map, that maps security issue types to threat levels 624. For example, for any identified security issue, the security issue may have a security issue type that can be used as an index for identifying the corresponding threat level 624 and, from that threat level, the appropriate response actions. Storage devices 620 may include a vulnerability analyzers 628.1-628.*n* for identifying security threats. For example, each storage device 620 may use their respective vulnerability analyzer 628 to analyze their own device data for internal security vulnerabilities and/or analyze peer device data received through peer messaging for peer security vulnerabilities.

The mechanics of peer messaging are described above. Each peer message, whether request, response, or broadcast, may include peer message payload 630 including one or more parameter values for conveying security information. For example, peer message payload 630.1 may include parameters for a threat notification message and peer message payload 630.2 may include example device parameters for vulnerability analysis. Each storage device 620 may send messages with peer message payload 630 reflecting their identified security threats and/or underlying device data to be used in vulnerability analysis. Note that the payload parameters shown in FIG. 6 are examples only. Not all parameters may be included in every message, and other parameters and/or sets of parameters for power management may be used beyond those shown.

Threat level 632 may include a security threat level value based on the sending storage device's assessment of an identified security threat. In some embodiments, peer storage devices may adopt this threat level for its own response and/or use the peer threat level to coordinate responses. Issue type 635 may include a security issue type value based on a classification scheme for security threats, such as interface vulnerabilities, firmware vulnerabilities, or other vulnerabilities, and/or active threats, such as virus, worm, ransomware, spyware, unauthorized access, etc. Threat level 632 and issue type 635 may be used in various threat notification messages among storage devices 620.

Boot time 636 may include a boot time value based on the boot log for a storage device and may be evaluated by a peer storage device against an acceptable range of boot times to assess the likelihood of a security threat. Firmware version 638 may include a firmware version identifier for the current firmware of a storage device and may be evaluated by a peer storage device against current firmware versions and/or lists of prior firmware versions with known vulnerabilities. Log data 640 may include sets of log data, such as debug, system trace, boot, security, and similar data logged by storage devices 620 and may be used by peer storage devices to run various security checks to identify irregular behavior or patterns corresponding to previously identified security threats. Security metrics 642 may include sets of security data, such as the output of internal or external security scans, and may be used by peer storage devices to analyze specific security threats identified in the security scans. Any storage device 620 may share one or more of these data types (and others) through peer messaging to assist in vulnerability management across a peer group.

Figure 7:
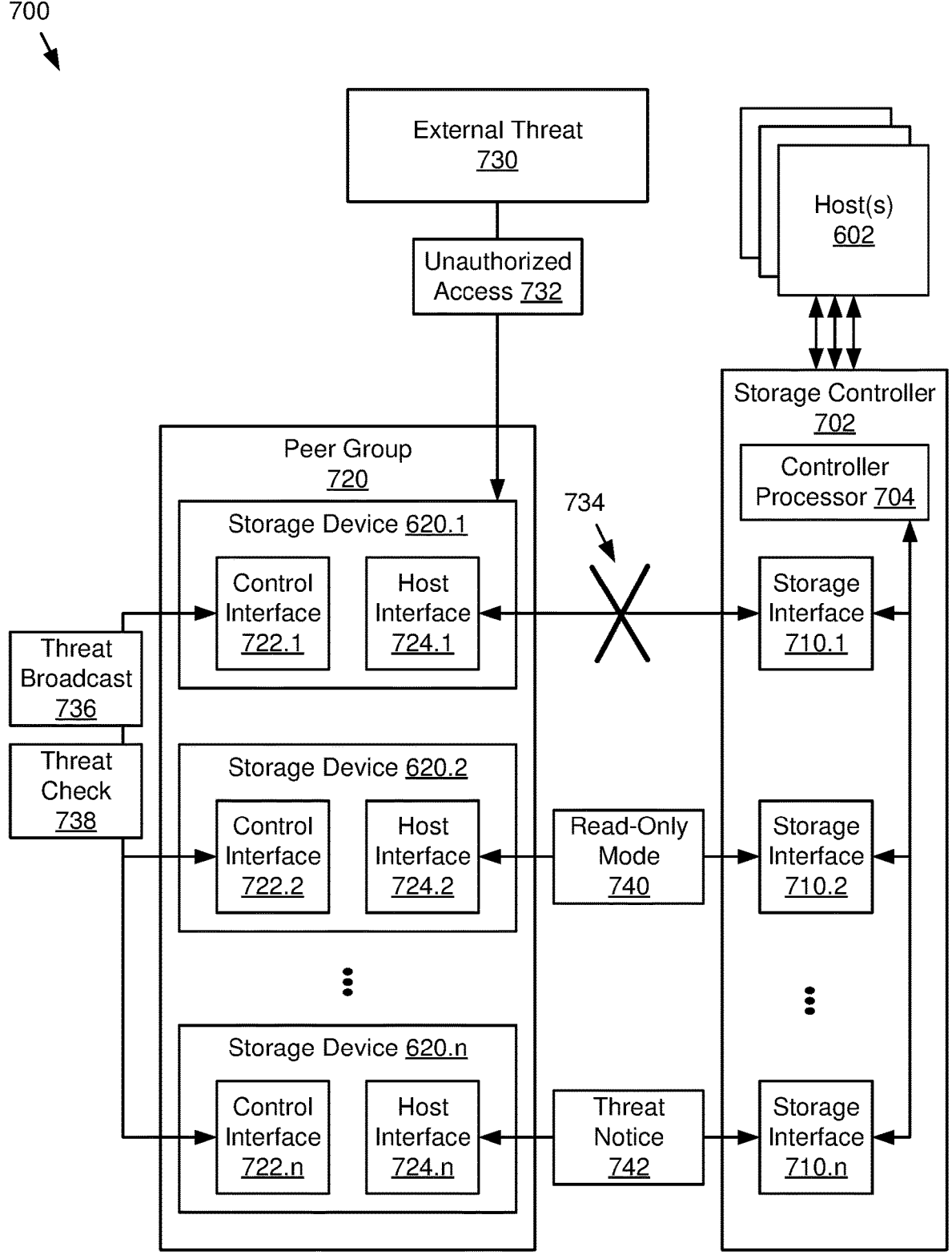
FIG. 7 schematically illustrates an example threat response for the storage devices of FIGS. 1-6.

FIG. 7 shows an example response of a storage system 700 to an external threat 730. For example, storage devices 620.1-620.$n$ from FIG. 6 may be configured as a peer group 720 connected by control interfaces 722.1-722.$n$ using peer messaging. Storage devices 620 are configured to store host data for hosts 602 through host interfaces 724.1-724.$n$. In the configuration shown, peer group 720 interfaces with hosts 602 through a storage controller 702 that includes a controller processor 704 and storage interfaces 710.1-710.$n$. For example, host interfaces 724 and storage interfaces 710 may be configured for NVMe storage protocols over a PCIe interface. These protocols may enable administrative commands and storage device status information to also be shared across host interfaces 724 and storage interfaces 710 to storage controller 702 and/or hosts 602. In some configurations, storage devices 620 may also be configured for peer communication across host interfaces 724 and interconnecting fabric. In some embodiments, hosts 602 may comprise virtual machines, where each storage device 620 and corresponding host interface 724 may be mapped to one or more virtual hosts. For example, storage controller 702 may manage physical and logical connections to storage devices 620 on behalf of a hypervisor application that enables hosts 602 to be dynamically mapped to computing resources, include storage resources, such as namespaces, stored within storage devices 620.

External threat 730 may include a hacker, bot, or another source of malicious access or software. In the example shown, external threat 730 achieves unauthorized access 732 to storage device 620.1 though an unlocked network port. As a result of the attack or due to an unrelated interruption in connectivity and/or host availability, host communication is interrupted 734 and no communication to or support from hosts 602 or storage controller 702 may be available (including peer communication through host interface 724.1). Storage device 620.1 may identify the security threat, such as using a vulnerability analyzer, and classify the security threat type as unauthorized access. Based on the threat map of storage device 620.1, unauthorized access is a high threat level. In some configurations, storage device 620.1 initiates a threat broadcast 736 in response through control interface 722.1 to storage devices 620 in peer group 720. In some configurations, the vulnerability analysis by storage device 620.1 and/or threat broadcast 736 may be responsive to a periodic threat check 738 from a peer storage device, such as storage device 620.2.

Upon receiving the threat notification in threat broadcast 736, storage device 620.2 may use the security issue type (unauthorized access) to determine its response. In the example shown, unauthorized access of a peer storage device is configured as a medium threat for storage device 620.2 and storage device 620.2 changes its operating mode to read-only mode 740. The change to read-only mode and/or related threat notification information may be passed to storage controller 702 and/or impacted hosts 602 through host interface 724.2. Even if the host connection was not available for some reason, storage device 620.2 would still have initiated the threat response of entering read-only mode without host intervention. For example, if one or more virtual hosts 602 are not available during an attack, storage device 620.2 may enter read-only mode to protect internal data without any interaction with hosts 602 or a corresponding hypervisor.

Upon receiving the threat notification in threat broadcast 736, storage device 620.$n$ may use the security issue type (unauthorized access) to determine its response. In the example shown, unauthorized access of a peer storage device is configured as a low threat for storage device 620.$n$ and storage device 620.$n$ does not change its operating mode. It does generate a peer security threat notification to storage controller 702 and/or hosts 602 to assure that the system is notified of the security threat even if storage device 620.1 is not able to send a host notification itself.

Figure 8:
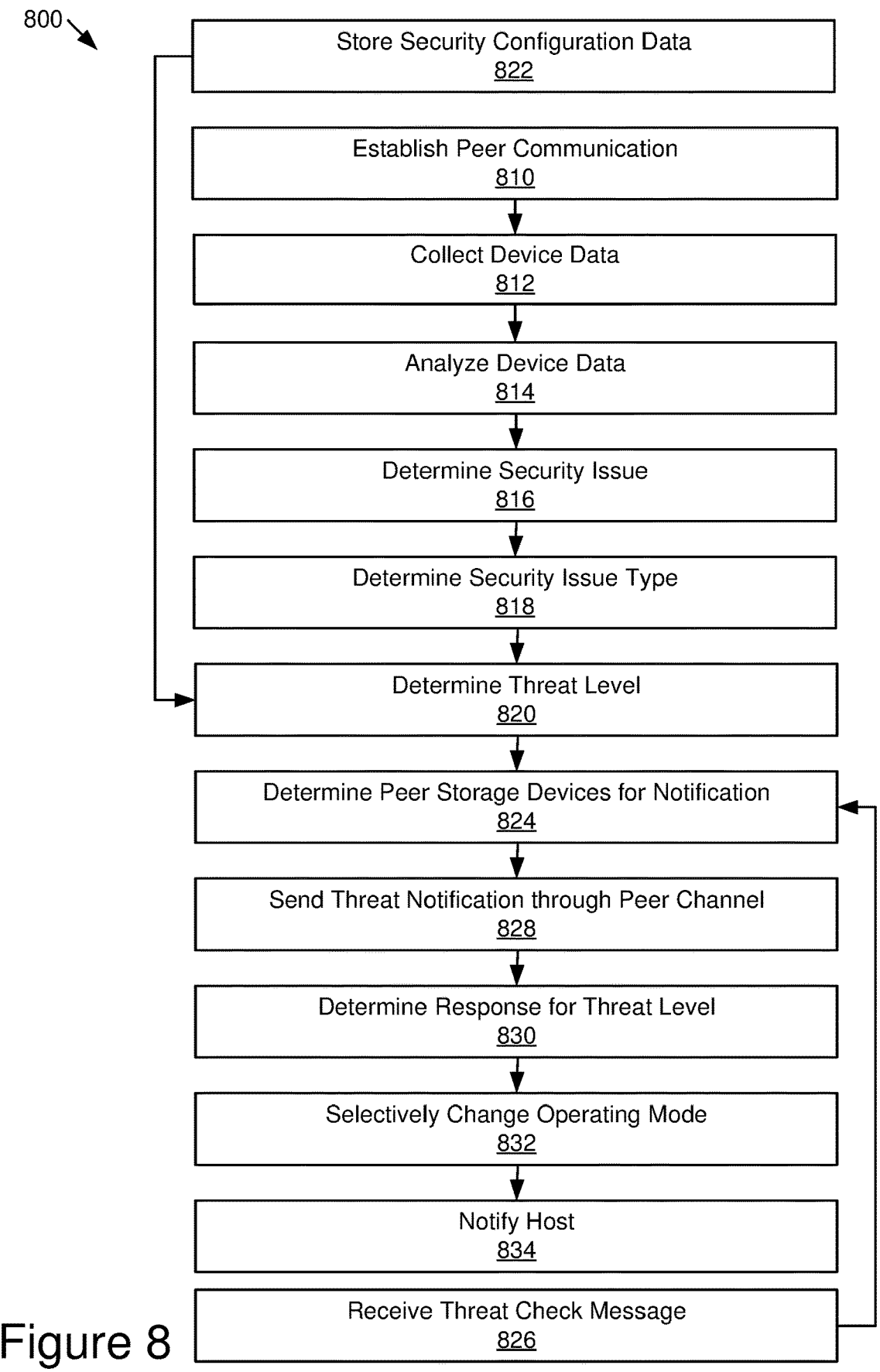
FIG. 8 is a flowchart of an example method of managing vulnerabilities by notifying peer storage devices.

As shown in FIG. 8, storage device 500 may be operated according to an example method for managing vulnerabilities by notifying peer storage devices, i.e., according to method 800 illustrated by blocks 810-834 in FIG. 8.

At block 810, peer communication may be established. For example, a discovery service complying with a control bus protocol may initiate communications among the peer storage devices in a peer group.

At block 812, device data may be collected. For example, a vulnerability manager may collect internal device data for use in security vulnerability analysis.

At block 814, device data may be analyzed. For example, the vulnerability manager may analyze the collected device data to identify security issues based on parameter ranges and/or patterns in the collected device data.

At block 816, a security issue may be determined. For example, the vulnerability manager may identify a security issue, such as a vulnerability or active threat, from the collected device data.

At block 818, a security issue type may be determined. For example, the vulnerability manager may classify the identified security issue according to a set of security issue types.

At block 820, a threat level may be determined. For example, the vulnerability manager may identify a security threat level based on a security issue type to threat level map.

At block 822, security configuration data may be stored. For example, prior to determination of the threat level at block 820, the storage device may have been configured with a security configuration that maps security issue types to different security threat levels and the determination of the threat level at block 820 may be based on the stored security configuration data for the storage device.

At block 824, peer storage devices for notification may be determined. For example, a peer communication service may determine one or more peer storage devices to receive a security threat notification for the identified security issue.

At block 826, a threat check message may be received. For example, prior to determining peer storage devices for notification at block 824 (and, in some configurations, prior to the preceding collect, analyze, and/or determine security issue blocks), the storage device may receive a threat check message through the peer channel and one or more threat notifications may be responsive to the threat check message.

At block 828, a threat notification may be sent through the peer channel. For example, the peer communication service may send a direct peer message or a broadcast message including the security issue type to peer storage devices.

At block 830, a response may be determined for the threat level. For example, the vulnerability manager may use the threat level determined at block 820 to determine one or more responses to the identified security issue.

At block 832, an operating mode may be selectively changed. For example, depending on the threat level and corresponding responses, vulnerability manager may initiate a change in operating mode, such as changing to a read-only mode, to protect host data until the security threat is resolved.

At block 834, a host may be notified. For example, if host communication is possible, the vulnerability manager may also notify one or more impacted host systems of the security threat through the host interface.

Figure 9:
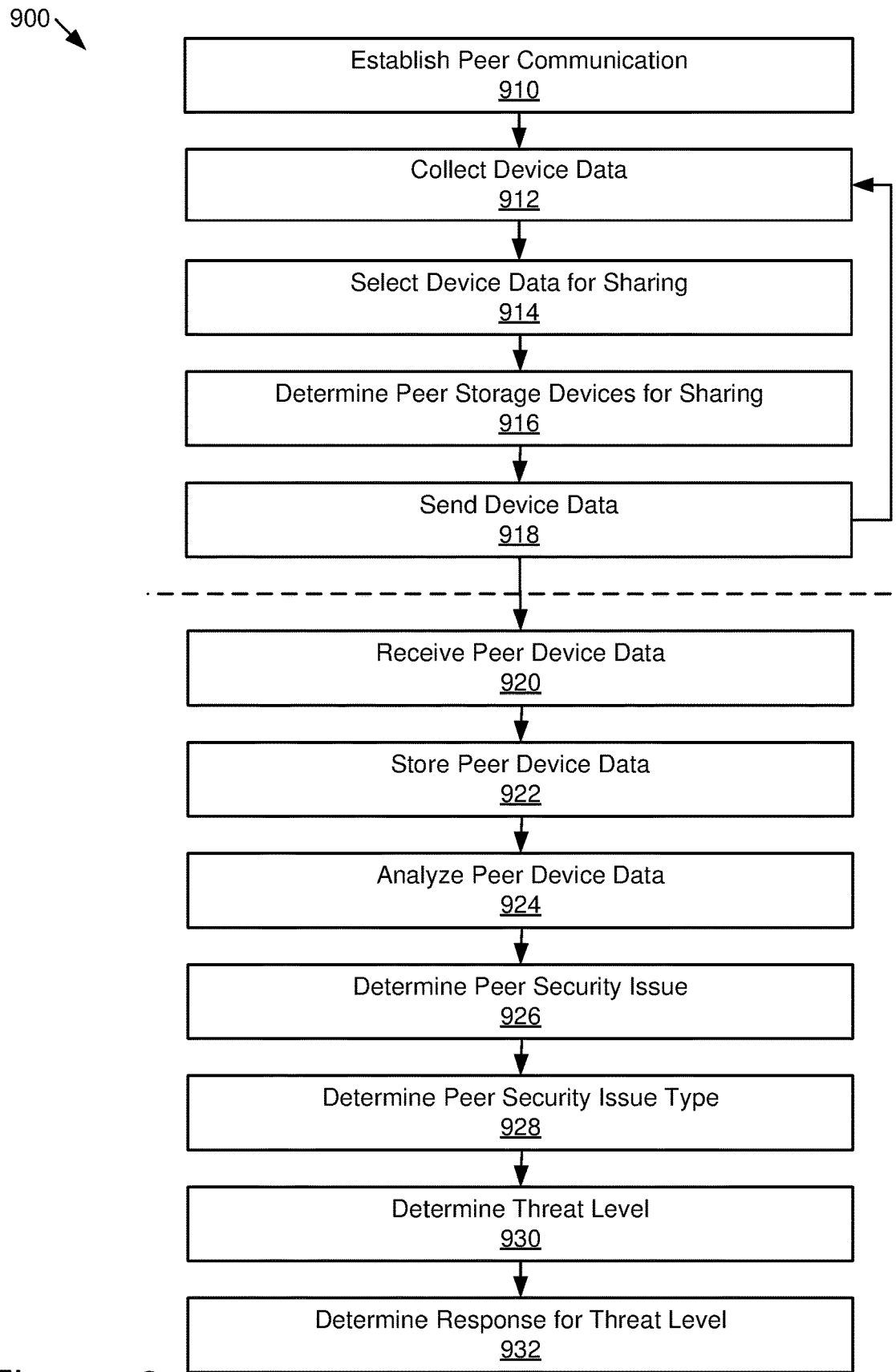
FIG. 9 is a flowchart of an example method of managing vulnerabilities by monitoring peer storage device data.

As shown in FIG. 9, storage device 500 may be operated according to an example method for managing vulnerabilities by monitoring peer storage device data, i.e., according to method 900 illustrated by blocks 910-932 in FIG. 9.

At block 910, peer communication may be established. For example, a discovery service complying with a control bus protocol may initiate communications among the peer storage devices in a peer group.

At block 912, device data may be collected. For example, a vulnerability manager may collect internal device data for use in security vulnerability analysis.

At block 914, device data may be selected for sharing. For example, the vulnerability manager may select subsets of the collected internal device data for use in security vulnerability analysis by peer storage devices.

At block 916, peer storage devices for sharing may be determined. For example, a peer communication service may determine one or more peer storage devices to receive a vulnerability data sharing message containing the set of device data selected at block 914.

At block 918, the device data may be sent. For example, the peer communication service may send a direct peer message or a broadcast message including the selected set of device data to peer storage devices over the control bus.

At block 920, peer device data may be received. For example, the data storage device that sent the internal device data at block 918 may receive peer device data from a peer storage device by a similar process executed by that peer storage device or blocks 920-932 may be executed by a peer storage device receiving the device data sent at block 918, which would be peer device data from the perspective of that peer storage device.

At block 922, peer device data may be stored. For example, the receiving storage device may store the peer device data to non-volatile memory.

At block 924, peer device data may be analyzed. For example, the vulnerability manager may analyze the received peer device data to identify security issues based on parameter ranges and/or patterns in the peer device data.

At block 926, a peer security issue may be determined. For example, the vulnerability manager may identify a security issue, such as a vulnerability or active threat, from the peer device data.

At block 928, a peer security issue type may be determined. For example, the vulnerability manager may classify the identified security issue according to a set of security issue types.

At block 930, a threat level may be determined. For example, the vulnerability manager may identify a security threat level based on a security issue type to threat level map.

At block 932, a response may be determined for the threat level. For example, the vulnerability manager may use the threat level determined at block 930 to determine one or more responses to the identified peer security issue for the peer storage device.

Figure 10:
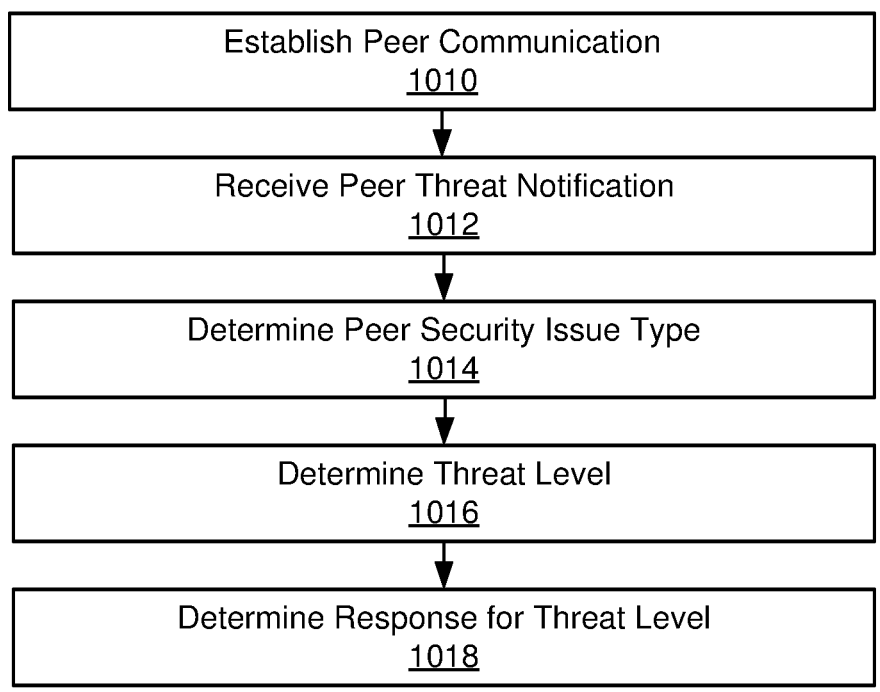
FIG. 10 is a flowchart of an example method of managing vulnerabilities by responding to peer threat notifications.

As shown in FIG. 10, storage device 500 may be operated according to an example method for managing vulnerabilities by responding to peer threat notifications, i.e., according to method 1000 illustrated by blocks 1010-1018 in FIG. 10.

At block 1010, peer communication may be established. For example, a discovery service complying with a control bus protocol may initiate communications among the peer storage devices in a peer group.

At block 1012, a peer threat notification may be received. For example, a peer communication service may receive a threat notification for a peer storage device in the peer group.

At block 1014, a peer security issue type may be determined. For example, the peer communication service may parse a security issue type value from the threat notification message received at block 1012 and pass it to the vulnerability manager.

At block 1016, a threat level may be determined. For example, the vulnerability manager may identify a security threat level based on a security issue type to threat level map.

At block 1018, a response may be determined for the threat level. For example, the vulnerability manager may use the threat level determined at block 1016 to determine one or more responses to the identified peer security issue for the peer storage device.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

The invention claimed is:

1. A system, comprising:
a first data storage device comprising:
   a non-volatile storage medium configured to store host data;
   a processor;
   a memory;
   a host interface configured to connect to a host system via a storage interface bus for receiving storage commands from the host system through first physical channels and transport protocols of the storage interface bus;
   a peer interface configured for peer communication with a plurality of peer data storage devices, wherein the peer interface is further configured to connect to a control bus that is physically distinct from the storage interface bus and uses second physical channels and transport protocols that are different than the first physical channels and transport protocols for peer communication;
   a vulnerability manager configured to determine a security issue for the first data storage device; and
   a peer messaging service configured to send, through the peer interface and responsive to determining the security issue, a threat notification to at least one peer data storage device of the plurality of peer data storage devices.

2. The system of claim 1, wherein:
the peer interface comprises a control bus interface configured to connect to the control bus, wherein:
   a maximum bandwidth of the second physical channels and transport protocols of the control bus is a lower bandwidth than a maximum bandwidth of the first physical channels and transport protocols of the storage interface bus; and
   the control bus interface is not configured to receive storage commands from the host system;
the first data storage device further comprises a control bus protocol configured for the peer communication through the control bus and different from a storage interface protocol used for host communication through the storage interface bus; and
the peer communication with the plurality of peer data storage devices is independent of availability of the host system.

3. The system of claim 1, wherein:
the first data storage device further comprises security configuration data configured to map a plurality of security issue types to a plurality of threat levels; and
the vulnerability manager is further configured to:
determine, based on a security issue type for an identified security issue, a corresponding threat level from the plurality of threat levels; and
selectively change, based on the corresponding threat level, an operating mode of the first data storage device.

4. The system of claim 3, wherein the identified security issue is selected from:
the security issue for the first data storage device; and
a threat notification received from at least one peer data storage device of the plurality of peer data storage devices.

5. The system of claim 3, wherein selectively changing the operating mode of the first data storage device comprises entering a read only mode.

6. The system of claim 1, wherein:
sending the threat notification includes sending a broadcast message to the plurality of peer data storage devices; and
the broadcast message includes a security issue type for the security issue.

7. The system of claim 6, further comprising:
the plurality of peer data storage devices, wherein:
each peer data storage device of the plurality of peer data storage devices comprises:
a non-volatile storage medium of that peer data storage device;
a host interface of that peer data storage device configured to connect to the host system via the storage interface bus for receiving storage commands from the host system;
a peer interface of that peer data storage device configured for peer communication with the plurality of peer data storage devices via the control bus;
security configuration data for that peer data storage device; and
a vulnerability manager for that peer data storage device configured to determine a response to the broadcast message based on the security issue type and the security configuration data for that peer data storage device; and
a first response by a first peer data storage device of the plurality of peer data storage devices is different than a second response of a second peer data storage device of the plurality of peer data storage devices.

8. The system of claim 1, wherein:
the peer messaging service is further configured to periodically receive, from the at least one peer data storage device, a threat check message; and
sending the threat notification is responsive to receiving the periodic threat check message.

9. The system of claim 1, wherein:
the vulnerability manager is further configured to collect device data for determining the security issue; and
the collected device data is selected from:
firmware states;
interface states;
security logs;
cryptography test data;
boot logs; and
debug logs.

10. The system of claim 9, wherein:
the first data storage device further comprises a threat sharing service configured to select at least a portion of the collected device data for the first data storage device;
the peer messaging service is further configured to:
send, to at least one peer data storage device of the plurality of peer data storage devices, the portion of the collected device data; and
receive, from at least one peer data storage device of the plurality of peer data storage devices, peer device data collected from the at least one peer data storage device; and
the vulnerability manager is further configured to:
analyze the peer device data for security issues;
determine a peer security issue for the at least one peer data storage device; and
determine a response to the peer security issue.

11. A computer-implemented method, comprising:
establishing, from a first data storage device, peer communication with a plurality of peer data storage devices, wherein the first data storage device and each peer data storage device of the plurality of peer data storage devices include:
a non-volatile storage medium configured to store host data;
a host interface configured to connect to a host system via a storage interface bus for receiving storage commands from the host system through first physical channels and transport protocols of the storage interface bus; and
a peer interface configured for peer communication with a plurality of peer data storage devices, wherein the peer interface is further configured to connect to a control bus that is physically distinct from the storage interface bus and uses second physical channels and transport protocols that are different than the first physical channels and transport protocols for peer communication;
determining a security issue for the first data storage device; and
sending, through the peer interface and responsive to determining the security issue, a threat notification to at least one peer data storage device of the plurality of peer data storage devices.

12. The computer-implemented method of claim 11, wherein:
the peer interface comprises a control bus interface configured to connect to the control bus, wherein:
a maximum bandwidth of the second physical channels and transport protocols of the control bus is a lower bandwidth than a maximum bandwidth of the first physical channels and transport protocols of the storage interface bus; and
the control bus interface is not configured to receive storage commands from the host system;
the first data storage device and each peer data storage device of the plurality of peer data storage devices further include a control bus protocol configured for the peer communication through the control bus and different from a storage interface protocol used for host communication through the storage interface bus; and
the peer communication with the plurality of peer data storage devices is independent of availability of the host system.

13. The computer-implemented method of claim 11, further comprising:
- determining, based on a security issue type for an identified security issue, a corresponding threat level from a plurality of threat levels, wherein the first data storage device and each peer data storage device of the plurality of peer data storage devices further include security configuration data configured to map a plurality of security issue types to the plurality of threat levels; and
- selectively changing, based on the corresponding threat level, an operating mode of the first data storage device.

14. The computer-implemented method of claim 13, further comprising:
- receiving, by the first data storage device and from at least one peer data storage device of the plurality of peer data storage devices, a threat notification through the peer interface;
- determining the identified security issue from the threat notification; and
- determining the security issue type for the identified security issue.

15. The computer-implemented method of claim 13, wherein selectively changing the operating mode of the first data storage device comprises entering a read only mode.

16. The computer-implemented method of claim 11, wherein:
- sending the threat notification includes sending a broadcast message to the plurality of peer data storage devices; and
- the broadcast message includes a security issue type for the security issue.

17. The computer-implemented method of claim 11, further comprising:
- periodically receiving, by the first data storage device and from the at least one peer data storage device, a threat check message, wherein sending the threat notification is responsive to receiving the periodic threat check.

18. The computer-implemented method of claim 11, further comprising:
- collecting, by the first data storage device and each peer data storage device of the plurality of peer data storage devices, device data for determining security issues, wherein the collected device data is selected from:
    - firmware states;
    - interface states;
    - security logs;
    - cryptography test data;
    - boot logs; and
    - debug logs.

19. The computer-implemented method of claim 18, further comprising:
- selecting, by the first data storage device and each peer data storage device of the plurality of peer data storage devices, at least a portion of the collected device data for that data storage device;
- sending, from the first data storage device to at least one peer data storage device of the plurality of peer data storage devices, the portion of the collected device data for the first data storage device;
- receiving, by the first data storage device and from at least one peer data storage device of the plurality of peer data storage devices, the portion of the collected device data for the at least one peer data storage device;
- analyzing, by the first data storage device, the portion of the collected device data for the at least one peer data storage device for security issues;
- determining, by the first data storage device, a peer security issue for the at least one peer data storage device; and
- determining a response to the peer security issue.

20. A storage system, comprising:
- a storage interface bus comprising first physical channels configured for a first transport protocol;
- a control bus comprising second physical channels configured for a second transport protocol, wherein the first physical channels and first transport protocol are different from the second physical channels and second transport protocol; and
- a plurality of peer data storage devices, wherein each peer data storage device of the plurality of peer data storage devices comprises:
    - a non-volatile storage medium configured to store host data;
    - a processor;
    - a memory;
    - a host interface configured to connect to a host system via the storage interface bus for receiving storage commands from the host system;
    - a control bus interface configured to connect to the control bus that is physically distinct from the storage interface bus;
    - means for establishing, through the control bus interface, peer communication among the plurality of peer data storage devices via the control bus;
    - means for determining a security issue for a first data storage device of the plurality of peer data storage devices; and
    - means for sending, through the control bus interface and responsive to determining the security issue, a threat notification to at least one peer data storage device of the plurality of peer data storage devices.

* * * * *